(12) United States Patent
Liu et al.

(10) Patent No.: US 11,864,132 B2
(45) Date of Patent: Jan. 2, 2024

(54) MEASUREMENT SIGNAL CONFIGURATION METHOD AND APPARATUS

(71) Applicant: HUAWEI TECHNOLOGIES CO., LTD., Guangdong (CN)

(72) Inventors: Fengwei Liu, Chengdu (CN); Lei Chen, Shenzhen (CN); Jing Qiu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 445 days.

(21) Appl. No.: 17/212,536

(22) Filed: Mar. 25, 2021

(65) Prior Publication Data

US 2021/0212007 A1  Jul. 8, 2021

Related U.S. Application Data

(63) Continuation of application No. PCT/CN2019/103143, filed on Aug. 28, 2019.

(30) Foreign Application Priority Data

Sep. 26, 2018 (CN) .......................... 201811122607.1

(51) Int. Cl.
*H04W 56/00* (2009.01)
*H04W 24/02* (2009.01)

(52) U.S. Cl.
CPC ......... *H04W 56/001* (2013.01); *H04W 24/02* (2013.01)

(58) Field of Classification Search
CPC ........................... H04W 56/001; H04W 24/02
See application file for complete search history.

(56) References Cited

U.S. PATENT DOCUMENTS

| 2016/0073367 A1 | 3/2016 | Li et al. |
| 2018/0092139 A1 | 3/2018 | Novlan et al. |
| 2018/0124718 A1 | 5/2018 | Ng et al. |
| 2019/0261411 A1* | 8/2019 | Chin ..................... H04W 80/02 |

(Continued)

FOREIGN PATENT DOCUMENTS

| CN | 101662064 A | 3/2010 |
| CN | 104955152 A | 9/2015 |

(Continued)

OTHER PUBLICATIONS

Intel Corporation, "PHY layer enhancement for NR IAB," 3GPP TSG RAN WG1 #93, R1-1806551, Busan, South Korea, May 21-25, 2018, 17 pages.

(Continued)

*Primary Examiner* — Zhiren Qin
(74) *Attorney, Agent, or Firm* — Fish & Richardson P.C.

(57) ABSTRACT

This specification discloses signal configuration methods and apparatuses. One method includes: sending, by a first node of a wireless system, a synchronization signal block (SSB) at a set of candidate locations of SSBs, wherein the SSB is used by a second node of the wireless system to detect or measure the SSB; receiving, by the first node, SSB optimization configuration information comprising an identifier of the SSB; determining, by the first node, a subset of the set of candidate locations based on the SSB optimization configuration information; and sending, by the first node, the SSB at the subset of the set of candidate locations.

20 Claims, 13 Drawing Sheets

(56) References Cited

U.S. PATENT DOCUMENTS

| | | | |
|---|---|---|---|
| 2020/0337004 A1* | 10/2020 | Li | H04B 17/382 |
| 2021/0029704 A1* | 1/2021 | Zhou | H04W 56/001 |
| 2021/0143959 A1* | 5/2021 | Xu | H04W 48/16 |
| 2022/0182869 A1* | 6/2022 | Eriksson | H04W 76/20 |
| 2022/0312354 A1* | 9/2022 | Teyeb | H04W 56/002 |

FOREIGN PATENT DOCUMENTS

| | | |
|---|---|---|
| CN | 107409297 A | 11/2017 |
| CN | 107409332 A | 11/2017 |
| CN | 108513323 A | 9/2018 |

OTHER PUBLICATIONS

AT&T, "Summary of 7.7.1 Enhancements to support NR backhaul links," 3GPP TSG RAN WG1 Meeting #93, R1-1807703, Busan, Korea, May 21-25, 2018, 19 pages.

Office Action in Chinese Application No. 201811122607.1, dated Sep. 30, 2020, 7 pages.

PCT International Search Report and Written Opinion in International Application No. PCT/CN2019/103143, dated Oct. 29, 2019, 14 pages.

LG Electronics, "Discussions on discovery among NR IAB nodes," 3GPP TSG RAN WG1 Meeting #94, R1-1808513, Gothenburg, Sweden, Aug. 20-24, 2018, 7 pages.

Ericsson, "IAB physical layer enhancement for backhaul link management," 3GPP TSG-RAN WG1 Meeting #94, R1-1809231, Gothenburg, Sweden, Aug. 20-24, 2018, 8 pages.

Extended European Search Report in European Application No. 19866949.1, dated Sep. 23, 2021, 9 pages.

\* cited by examiner

MEASUREMENT SIGNAL CONFIGURATION METHOD AND APPARATUS

CROSS-REFERENCE TO RELATED APPLICATIONS

This application is a continuation of International Application No. PCT/CN2019/103143, filed on Aug. 28, 2019, which claims priority to Chinese Patent Application No. 201811122607.1, filed on Sep. 26, 2018. The disclosures of the aforementioned applications are hereby incorporated by reference in their entireties.

TECHNICAL FIELD

The present invention relates to communications technologies, and in particular, to a measurement signal configuration method and an apparatus of a relay node in a wireless communications system.

BACKGROUND

With continuous development of mobile communications technologies, spectrum resources become increasingly insufficient. To improve spectrum utilization, base stations are to be deployed more densely in the future. In addition, dense deployment can avoid coverage holes. In a conventional cellular network architecture, a base station establishes a connection to a core network by using an optical fiber. However, deployment costs of the optical fiber are very high. A wireless relay node (RN) establishes a connection to the core network through a wireless backhaul link, to reduce some of the deployment costs of the optical fiber.

Generally, the wireless relay node establishes the wireless backhaul link with one or more parent nodes, and accesses the core network through the parent node. The wireless relay node may provide a service for each of a plurality of child nodes. The parent node of the relay node may be a base station or another relay node. The child node of the relay node may be a user equipment (UE), or may be another wireless relay node.

A wireless relay is classified into an in-band relay and an out-of-band relay based on radio resources used by a backhaul link and an access link. The in-band relay is a relay solution in which the backhaul link and the access link share a same frequency band. Because no additional spectrum resource is used, the in-band relay has advantages such as high spectral efficiency and low deployment costs. The in-band relay is usually subject to a half-duplex constraint. Specifically, when receiving a downlink signal sent by the parent node of the relay node, the relay node cannot send a downlink signal to the child node of the relay node, and when receiving an uplink signal sent by the child node of the relay node, the relay node cannot send an uplink signal to the parent node of the relay node. The in-band relay solution is used for a new radio (NR) of a 5th generation mobile communications (5G) radio access network (RAN). The NR-based in-band relay solution is referred to as integrated access and backhaul (AB), and an integrated access and backhaul relay node is referred to as an JAB node.

When a plurality of JAB nodes exist in a network, the JAB nodes need to discover or measure each other, to establish a multi-connection, maintain a backup connection, or perform interference measurement. Generally, the IAB node may discover a remaining IAB node by measuring a reference signal, for example, a synchronization signal block (SSB). In addition, the IAB node further needs to send the reference signal, for example, the SSB, so that the UE or the remaining IAB node discovers and measures the IAB node. Due to the foregoing half-duplex constraint, the IAB node cannot simultaneously send and receive the SSB, and SSB locations of different IAB nodes are usually at a same time location. Therefore, when measuring an SSB of the remaining node, the IAB node needs to stop sending the SSB of the AB node. To maintain measurement performed by the AB node on a parent node or provide a measurement signal for a child node, a large quantity of resources are consumed. How to effectively discover or measure the IAB node and save resource overheads is a problem that needs to be considered in a design of an JAB node discovery and/or measurement mechanism.

SUMMARY

Embodiments of this application provide a measurement signal configuration method and an apparatus, to resolve a problem that system resource utilization is reduced due to excessively high overheads for sending an SSB when the SSB is sent at a first candidate location of the SSB in a relay system.

To achieve the foregoing objective, the following technical solutions are used in the embodiments of this application.

According to a first aspect, a measurement signal configuration method is provided. The method is applied to a wireless relay system. The wireless relay system includes at least a first node and a second node, the first node is an IAB node or a donor base station, and the second node is an IAB node. The method includes: The first node sends a synchronization signal block SSB at a first candidate location of the SSB. The synchronization signal block SSB is used by the second node to discover the first node or measure an SSB of the first node. The first candidate location of the SSB includes a set of candidate locations of SSBs sent by the first node to implement coverage. The first node receives SSB optimization configuration information. The SSB optimization configuration information includes an identifier or a number of the SSB. The first node determines a synchronization signal block SSB sending subset based on the SSB optimization configuration information. The sending subset includes some synchronization signal block SSB candidate locations. The first node sends the SSB on the SSB sending subset. In the foregoing technical solution, optimization configuration is performed on the SSB sent by the first node, to reduce a quantity of SSBs sent by the first node. This reduces overheads for sending the SSB by the first node, improves system resource utilization, and reduces transmit power of the first node.

In a possible implementation of the first aspect, the first node receives the SSB optimization configuration information from the second node or a donor base station, and the SSB optimization configuration information further includes at least one of an identifier of the second node, reference signal received power RSRP or a signal-to-interference ratio SINR of the measured SSB, an identifier of the first node, and a backhaul SSB configuration indication.

In a possible implementation of the first aspect, the backhaul SSB configuration indication includes at least one of the SSB identifier, an SSB switch indication, and SSB mode information. In the foregoing technical solution, the SSB sent by the first node may be optimized by using the SSB mode information, so that overheads for sending the SSB by the first node are reduced, and power consumption is reduced.

In a possible implementation of the first aspect, the first node reactivates to send the SSB at the first candidate location of the SSB. In the foregoing technical solution, the SSB at the first candidate location of the SSB is reactivated to be sent, so that an IAB system is very flexible. This not only can reduce overheads for sending the SSB, but also can support a node newly joining the IAB system in performing inter-node discovery and measurement. In addition, through different configurations, discovery and measurement of the new node can be flexibly considered, and overheads for sending the SSB can also be reduced.

In a possible implementation of the first aspect, that the first node reactivates to send the SSB at the first candidate location of the SSB includes: The first node periodically activates to send the SSB at the first candidate location of the SSB. Alternatively, the first node sends the SSB at the first candidate location of the SSB based on a fact that the first node detects an event that meets a condition. Alternatively, the first node receives an SSB activation indication sent by the donor base station, where the SSB activation indication is used to indicate the first node to send the SSB at the first candidate location of the SSB. In the foregoing technical solution, different manners of reactivating to send the SSB at the first candidate location of the SSB are defined. For example, the SSB at the first candidate location of the SSB is periodically activated to be sent, or the SSB at the first candidate location of the SSB is triggered to be sent by different events. This shortens a time for discovering a neighboring node when the new node joins the IAB system.

In a possible implementation of the first aspect, the SSB includes an SSB used for backhaul link measurement and an SSB used for initial access of a terminal. In the foregoing technical solution, when an AC SSB is used for the backhaul link measurement, measurement overheads of the first node can be reduced.

In a possible implementation of the first aspect, the first node uses the access SSB for the backhaul link measurement, the first node determines the AC SSB used for the backhaul link measurement, and if the first node determines that a candidate location of another AC SSB and the AC SSB used for the backhaul link measurement are consecutive in symbols, the first node skips sending the another AC SSB. In the foregoing technical solution, it is considered that when an SSB is used for measurement and when an SSB that is consecutive with the SSB used for the measurement on the symbols is used as the AC SSB, the SSB is not transmitted, so that unnecessary overheads for incomplete transmission of the AC SSB can be reduced, and system resources can be saved.

According to a second aspect, a measurement signal configuration method is provided. The method is applied to a wireless relay system. The wireless relay system includes at least a first node and a second node, the first node is an IAB node or a donor base station, and the second node is an IAB node. The method includes: The second node measures a synchronization signal block SSB at all synchronization signal block SSB candidate locations. The synchronization signal block SSB is used by the second node to discover or measure the first node. The second node sends SSB optimization configuration information to the donor base station or the first node. The SSB optimization configuration information includes an identifier or a number of the SSB. The second node receives a backhaul SSB measurement configuration indication. The backhaul SSB measurement configuration indication includes a subset of all SSB candidate locations of the first node. The second node measures a backhaul SSB according to the backhaul SSB measurement configuration indication. In the foregoing technical solution, optimization configuration is performed on the SSB measurement performed by the second node, to reduce overheads for detecting the IAB node by the second node. This reduces power overheads of the second node, and improves resource utilization.

In a possible implementation of the second aspect, the backhaul SSB measurement configuration indication further includes at least one of an identifier of the second node, reference signal received power RSRP or a signal-to-interference ratio SINR of the measured SSB, an identifier of the first node, and backhaul SSB configuration information.

In a possible implementation of the second aspect, that the second node receives a backhaul SSB measurement configuration indication includes: The second node receives the backhaul SSB measurement configuration indication sent by the donor base station. Alternatively, the second node receives the backhaul SSB measurement configuration indication sent by the first node.

In a possible implementation of the second aspect, the backhaul SSB measurement configuration indication includes at least one of the SSB identifier, an SSB switch indication, and SSB mode information. In the foregoing technical solution, the SSB sent by the first node may be optimized by using the SSB mode information, so that overheads for sending the SSB by the first node are reduced, and power consumption is reduced.

In a possible implementation of the second aspect, the second node reactivates to measure the SSB at all the SSB candidate locations. In the foregoing technical solution, the SSB at the first candidate location of the SSB is reactivated to be measured, so that an IAB system is very flexible. This not only can reduce overheads for measuring the SSB, but also can support a node newly joining the IAB system in performing discovery and measurement. In addition, through different configurations, discovery and measurement of the new node can be flexibly considered, and overheads for measuring the SSB can also be reduced.

In a possible implementation of the second aspect, that the second node reactivates to measure the SSB at all the SSB candidate locations includes: The second node periodically activates to measure the SSB at all the SSB candidate locations. Alternatively, the second node measures the SSB at all the SSB candidate locations based on a fact that the second node detects an event that meets a condition. Alternatively, the second node receives an SSB activation indication sent by the donor base station, where the SSB activation indication is used to indicate the second node to measure the SSB at all the SSB candidate locations. In the foregoing technical solution, different manners of reactivating to measure the SSB at the first candidate location of the SSB are defined. For example, the SSB at the first candidate location of the SSB is periodically activated to be measured, or the SSB at the first candidate location of the SSB is triggered to be measured by different events. This shortens a time for discovering a neighboring node when the new node joins the IAB system.

According to another aspect of this application, a first node is provided. The first node is configured to implement a function of the measurement signal configuration method according to any possible implementation of the first aspect. The function may be implemented by hardware, or may be implemented by hardware executing corresponding software. The hardware or the software includes one or more units corresponding to the foregoing function.

In a possible implementation, a structure of the first node includes a processor. The processor is configured to support user equipment in performing the measurement signal configuration method according to any one of the first aspect or the possible implementations of the first aspect. Optionally, the first node may further include a memory and a communications interface. The memory stores code and data, the memory is coupled to the processor, and the communications interface is coupled to the processor or the memory.

According to another aspect of this application, a second node is provided. The second node is configured to implement a function of the measurement signal configuration method according to any one of the second aspect or the possible implementations of the second aspect. The function may be implemented by hardware, or may be implemented by hardware executing corresponding software. The hardware or the software includes one or more units corresponding to the foregoing function.

In a possible implementation, a structure of the second node includes a processor. The processor is configured to support a network device in performing a function of the measurement signal configuration method according to any one of the second aspect or the possible implementations of the second aspect. Optionally, the network device may further include a memory and a communications interface. The memory stores and/or processes code required by a baseband processor, the memory is coupled to the processor, and the communications interface is coupled to the memory or the processor.

According to another aspect of this application, a computer-readable storage medium is provided. The computer-readable storage medium stores an instruction, and when the instruction is run on a computer, the computer is enabled to perform the measurement signal configuration method according to any one of the first aspect or the possible implementations of the first aspect, or perform the measurement signal configuration method according to any one of the second aspect or the possible implementations of the second aspect.

According to another aspect of this application, a computer program product including an instruction is provided. When the computer program product is run on a computer, the computer is enabled to perform the measurement signal configuration method according to any one of the first aspect or the possible implementations of the first aspect, or perform the measurement signal configuration method according to any one of the second aspect or the possible implementations of the second aspect.

According to another aspect of this application, a communications system is provided. The communications system includes a plurality of devices, and the plurality of devices include a first node and a second node. The first node is the first node provided in the foregoing aspects, and is configured to support the first node in performing the measurement signal configuration method according to any one of the first aspect or the possible implementations of the first aspect; and/or the second node is the second node provided in the foregoing aspects, and is configured to support the second node in performing the measurement signal configuration method according to any one of the second aspect or the possible implementations of the second aspect.

According to still another aspect of this application, an apparatus is provided. The apparatus is a processor, an integrated circuit, or a chip, and is configured to perform steps performed by a processing unit of the first node in the embodiments of the present invention. For example, the apparatus determines a synchronization signal block SSB sending subset based on SSB optimization configuration information, or reactivates to send an SSB at a first candidate location of the SSB. The apparatus is configured to: use an access SSB for backhaul link measurement, determine the AC SSB used for the backhaul link measurement, and if it is determined that a candidate location of another AC SSB and the AC SSB used for the backhaul link measurement are consecutive in symbols, skip sending the another AC SSB. The apparatus is further configured to perform processing or an action of the first node that has been described in the foregoing other aspects or embodiments. Details are not described herein again.

According to still another aspect of this application, another apparatus is provided. The apparatus is a processor, an integrated circuit, or a chip, and is configured to perform steps performed by a processing unit of the second node in the embodiments of the present invention. The another apparatus supports the second node in reactivating to measure an SSB at all SSB candidate locations in the foregoing embodiments. The another apparatus is further configured to perform processing or an action of the second node that has been described in the foregoing other aspects or embodiments. Details are not described herein again.

It may be understood that the apparatus, the computer storage medium, or the computer program product of the measurement signal configuration method provided above are used to perform the corresponding method provided above. Therefore, for beneficial effects that can be achieved by the apparatus, the computer storage medium, or the computer program product, refer to the beneficial effects of the corresponding method provided above. Details are not described herein again.

DESCRIPTION OF EMBODIMENTS

The following describes the technical solutions in embodiments of the present invention with reference to the accompanying drawings in the embodiments of the present invention. It is clearly that the described embodiments are merely some but not all of the embodiments of the present invention. All other embodiments obtained by a person skilled in the art based on the embodiments of the present invention without creative efforts shall fall within the protection scope of the present invention.

It should be understood that names of all nodes and messages in this application are merely names specified for ease of description in this application, and may be different names in an actual network. It should not be understood that names of various nodes and messages are limited in this application. On the contrary, any name that has a same or similar function as that of a node or a message used in this application is considered as a method or an equivalent replacement in this application, and is within the protection scope of this application. Details are not described below again.

High bandwidth of a future wireless network is considered, and an JAB solution is considered to be introduced into an NR to further reduce deployment costs and improve deployment flexibility, and an integrated access and backhaul relay is introduced accordingly. In this application, a relay node of an integrated access and backhaul is referred to as an integrated access and backhaul node (IAB node), to distinguish from a relay of a long term evolution (LTE) system.

Figure 1:
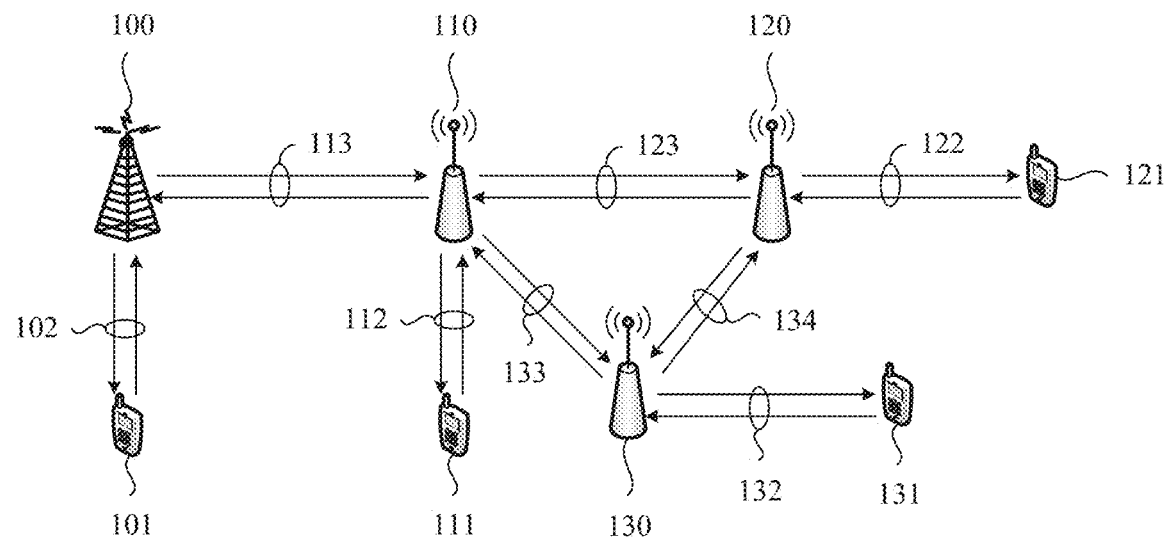
FIG. 1 shows an IAB communications system according to an embodiment of this application.

For a better understanding of a measurement signal configuration method and an apparatus disclosed in the embodiments of the present invention, the following first describes a network architecture used in the embodiments of the present invention. FIG. 1 is a schematic structural diagram of a communications system applicable to an embodiment of this application.

It should be noted that the communications system mentioned in this embodiment of this application includes but is not limited to a narrowband internet of things (NB-IoT) system, a wireless local area network (WLAN) system, an LTE system, a next-generation 5G mobile communications system, or a communications system after 5G, for example, an NR system, or a device to device (D2D) communications system.

In the communications system shown in FIG. 1, an integrated access and backhaul IAB system is provided. One IAB system includes at least one base station 100, one or more user equipment (terminal) 101 served by the base station 100, one or more relay nodes, namely. IAB nodes, and one or more user equipment 111 served by the IAB node 110. Generally, the base station 100 is referred to as a donor base station (DgNB). The IAB node 110 is connected to the base station 100 through a wireless backhaul link 113. In this application, the donor base station is also referred to as a donor node, namely, a donor node. The base station includes but is not limited to an evolved NodeB (eNB), a radio network controller (RNC), a NodeB (NB), a base station controller (BSC), and a base transceiver station (BTS), a home base station (for example, a home evolved NodeB, or home NodeB, HNB), a baseband unit (BBU), an eLTE base station, an NR base station (gNB), and the like. The user equipment includes but is not limited to any one of user equipment (UE), a mobile station, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a mobile station in a future 5G network, a user equipment in a future evolved public land mobile network (PLMN) network, and the like. The IAB node is a specific name of the relay node, and does not constitute a limitation on the solutions of this application. The IAB node may be one of the foregoing base stations or user equipment that have a forwarding function, or may be in an independent device form.

An integrated access and backhaul system may further include a plurality of other AB nodes, for example, an TAB node 120 and an TAB node 130. The TAB node 120 is connected to the IAB node 110 by using a wireless backhaul link 123, to access a network. The IAB node 130 is connected to the IAB node 110 by using a wireless backhaul link 133, to access a network. The IAB node 120 serves one or more user equipment 121, and the TAB node 130 serves one or more user equipment 131. In FIG. 1, both the IAB node 110 and the IAB node 120 are connected to a network through a wireless backhaul link. In this application, the wireless backhaul link is viewed from a perspective of the relay node. For example, the wireless backhaul link 113 is a backhaul link of the TAB node 110, and the wireless backhaul link 123 is a backhaul link of the TAB node 120. As shown in FIG. 1, one IAB node, for example, 120, may be connected to another IAB node 110 through a wireless backhaul link, for example, 123, to connect to a network. In addition, the relay node may be connected to the network through a plurality of levels of wireless relay nodes. It should be understood that, in this application, the IAB node is used only for a purpose of description, and does not indicate that the solutions of this application are used only in an NR scenario. In this application, the TAB node may be any node or device that has a relay function. It should be understood that the IAB node and the relay node used in this application have a same meaning.

For ease of description, the following defines basic terms or concepts used in this application.

Parent node: A node that provides a wireless backhaul link resource, for example, 110 is referred to as a parent node of an IAB node 120. The parent node may also be referred to as an upstream node. It should be understood that the parent node is not limited to a direct parent node that provides the wireless backhaul link resource, and includes all nodes that provide the wireless backhaul link resource on a link on which transmission to the donor base station is provided.

The direct parent node refers to a node that directly provides a transmission resource for the relay node. For example, the IAB node 110 is a direct parent node of the AB node 120.

Child node. A node that uses a backhaul link resource to transmit data to a network or receive data from a network is referred to as a child node. For example, 120 is referred to as a child node of a relay node 110. The network is a network over a core network or another access network, for example, the internet or a dedicated network. Similarly, the child node is not limited to a direct child node that provides the wireless backhaul link resource for the child node, and includes all nodes that provide the wireless backhaul link resource on a link on which transmission to a target node is provided. The direct child node refers to a node that directly provides a transmission resource for the direct child node. For example, the JAB node 120 is a direct child node of the IAB node 110.

Access link: An access link is a link between UE and an IAB node or an AB donor node. Alternatively, the access link includes a radio link used when a node communicates with a child node of the node. The access link includes an uplink access link and a downlink access link. The uplink access link is also referred to as uplink transmission of the access link, and the downlink access link is also referred to as downlink transmission of the access link.

Backhaul link: A backhaul link is a link between an JAB node and an TAB child node or an IAB parent node. The backhaul link includes a downlink transmission link with the IAB child node or the IAB parent node, and an uplink transmission link with the JAB child node or the IAB parent node. That the IAB node transmits data to the AB parent node or receives uplink transmission of the IAB child node is referred to as uplink transmission of the backhaul link. That the IAB node receives data transmission from the IAB parent node or transmits data to the IAB child node is referred to as downlink transmission of the backhaul link. To distinguish between the UE and the IAB node, a backhaul link between the IAB node and the IAB parent node is also referred to as a parent backhaul link (parent BH), and a backhaul link between the IAB node and the IAB child node is referred to as a child backhaul link (child BH).

Waveform parameter: A waveform parameter is one subcarrier set or a parameter of some physical subcarriers with specific bandwidth or a carrier. The waveform parameter includes at least one of the following parameters: a subcarrier spacing, a cyclic prefix (CP) length, a transmission time interval (TTI), a symbol length, a quantity of symbols, and $\mu$. $\mu$ is an integer greater than or equal to 0. A value of $\mu$ ranges from 0 to 5. Each $\mu$ corresponds to a specific subcarrier spacing and a CP. A relationship between the subcarrier spacing and $\mu$ is $\Delta f = 2^{\mu} \cdot 15$ [kHz], where $\Delta f$ is the subcarrier spacing, Hz is a basic unit of frequency, and kHz is kilo Hz, namely, kilohertz.

Slot: A slot is a basic time domain unit in NR. One slot may include 14 or 12 symbols, and depends on a CP length in a waveform parameter used by the slot. It should be understood that, in some cases, the slot and a subframe are the same. For example, when a subcarrier spacing in the waveform parameter is 15 kHz, the slot and the subframe may be the same. Likewise, the slot should not be limited to the foregoing definition. In some cases, a mini-slot may further be defined. In other words, one or more symbols may also be referred to as one slot. The slot in this application includes a concept of the mini-slot. The symbol generally refers to an orthogonal frequency division multiplexing (OFDM) symbol. However, it should not be understood that the symbol is limited to the OFDM symbol, and may further include a symbol of another waveform, for example, a single-carrier orthogonal frequency division multiplexing symbol. One subframe may be, for example, 1 ms, and one subframe may include one or more slots. When one subframe includes only one slot, the subframe and the slot are the same. A slot or a subframe in the following description may be the slot or the subframe. In some cases, the subframe and the slot are the same, but in some cases, the subframe and the slot are different. Therefore, the slot or the subframe generally refers to a basic scheduling unit and the slot may be the mini-slot. Details are not described below again.

Backhaul link slot: A backhaul link slot is a slot used for data transmission on a backhaul link. Data transmission includes uplink transmission and downlink transmission. Uplink transmission refers to data transmission from a child node to a parent node, and downlink transmission refers to data transmission from a parent node to a child node.

Beam: A beam is a communications resource. The beam may be a wide beam, a narrow beam, or a beam of another type. A technology for forming the beam may be a beamforming technology or another technology. The beamforming technology may be specifically a digital beamforming technology, an analog beamforming technology, or a hybrid digital/analog beamforming technology. Different beams may be considered as different resources. Same information or different information may be sent on different beams. Optionally, a plurality of beams having a same or similar communication feature may be considered as one beam. One beam may include one or more antenna ports, configured to transmit a data channel, a control channel, a sounding reference signal, and the like. For example, a transmit beam may be distribution of signal strength formed in different directions in space after a signal is transmitted by using an antenna, and a receive beam may be distribution of strengthening or weakening reception of a radio signal by the antenna array in different directions in space. It may be understood that, one or more antenna ports forming one beam may also be considered as one antenna port set. In a current NR protocol, the beam may be embodied by using a quasi co-location (QCL) relationship between antenna ports. Specifically, two signals having a same beam have a QCL relationship with respect to a spatial Rx parameter, that is, a QCL-Type D {Spatial Rx parameter} in the protocol. In the protocol, the beam may specifically be represented by using identifiers of various signals, for example, a resource ID of a CSI-RS, a time domain index of an SS/PBCH, a resource ID of an SRS, and a resource ID of a TRS. The foregoing antenna port is a logical concept, and does not one-to-one correspond to a physical antenna. The antenna port is a logical unit formed by one or more physical antennas for transmitting one signal or one signal stream.

In-band relay: An in-band relay is a relay node in which a backhaul link and an access link share a same frequency band.

Space division multiplexing (SDM): Space division multiplexing means that a relay node simultaneously performs downlink transmission with UE or an IAB child node, and performs uplink transmission with an IAB parent node. Alternatively, the relay node simultaneously receives downlink transmission from the IAB parent node and uplink transmission from the UE or the IAB child node.

Usually, a child node may be considered as UE of a parent node. It should be understood that, in the integrated access and backhaul system shown in FIG. 1, one IAB node is connected to one parent node. However, in a future relay system, to improve reliability of the wireless backhaul link, one IAB node, for example, 120, may have a plurality of parent nodes providing services for one IAB node. As shown in the figure, the IAB node 130 may also be connected to the AB node 120 by using the backhaul link 134. That is, both the IAB node 110 and the IAB node 120 are parent nodes of the IAB node 130. Names of the IAB nodes 110, 120, and 130 do not constitute a limitation on a scenario or a network in which the IAB nodes 110, 120, and 130 are deployed, and there may be any other name such as relay or RN. In this application, the IAB node is used only for ease of description.

In FIG. 1, radio links 102, 112, 122, 132, 113, 123, 133, and 134 may be bidirectional links, including uplink and downlink transmission links. Specifically, the wireless backhaul links 113, 123, 133, and 134 may be used by a parent node to provide a service for a child node. For example, the parent node 100 provides a wireless backhaul service for the child node 110. It should be understood that an uplink and a downlink of the backhaul link may be separated. To be specific, transmission on the uplink and transmission on the downlink are not performed through a same node. The downlink transmission refers to transmitting information or data from the parent node such as the node 100 to the child node such as the node 110. The uplink transmission refers to transmitting information or data from the child node such as the node transit to the parent node such as the node 100. The node is not limited to a network node or a user equipment. For example, in a D2D scenario, a user equipment may be used as a relay node to serve another user equipment. In some scenarios, the wireless backhaul link may also be an access link. For example, the backhaul link 123 may also be considered as an access link for the node 110, and the backhaul link 113 is also an access link for the node 100. For the node 110, the link 113 is referred to as a parent backhaul link (parent BH), the link 123 is referred to as a child backhaul link (child BH), and the link 112 is referred to as an access link. It should be understood that the parent node may be a base station or a relay node, and the child node may be a relay node or a user equipment having a relay function. For example, in the D2D scenario, the child node may also be a user equipment.

The relay node shown in FIG. 1, for example, 110, 120, or 130 may exist in two forms. One form is that the relay node exists as an independent access node, and may independently manage a user equipment that accesses the relay node. In this case, the relay node generally has an independent physical cell identifier (PCI). A relay in this form usually needs to have all functions of a protocol stack, for example, a radio resource control (RRC) function. This relay is usually referred to as a layer 3 relay. A relay node and a donor node, such as a donor eNB or a donor gNB, that are in another form belong to a same cell, and a user is managed by a donor base station, for example, the donor node. This relay is usually referred to as a layer 2 relay. The layer 2 relay usually exists as a DU of a base station DgNB in a control and bearer separation (CU-DU) architecture of an NR, and communicates with a CU by using an F1AP (F application protocol) interface or a tunneling protocol. The tunneling protocol may be, for example, a GTP protocol. Details are not described again. The donor node is a node through which a core network may be accessed, or an anchor base station in a radio access network. A network may be accessed through the anchor base station. The anchor base station is responsible for receiving data of the core network and forwarding the data to the relay node, or receiving data of the relay node and forwarding the data to the core network.

In NR, a primary synchronization signal (PSS), a secondary synchronization signal (SSS), and a physical broadcast channel (PBCH) are referred to as a synchronization signal/broadcast signal block (SS/PBCH block). In this application, for ease of description, the SS/PBCH block is referred to as an SSB.

In time domain, one SSB includes four orthogonal frequency division multiplexing (OFDM) symbols. UE jointly determines an SSB block index by using a different DM-RS sequence and an index transmitted on the PBCH, to identify different SSBs. A specific method for determining the SSB block index is well known by a person of ordinary skill in the art. Details are not described again.

In NR, a synchronization signal is transmitted in a beam sweeping manner. An NR base station sends a plurality of SSBs in one period, each SSB covers a particular area, and each SSB is sent at an SSB candidate location defined in a protocol. All SSB candidates are within a half-frame (5 ms). In this application, the SSB candidate location is a symbol location in time domain. Details are not described below again.

In different frequency bands, a quantity of SSB candidates in the half-frame is different. Specifically, below 3 GHz (gigahertz, GHz), a quantity of SSB candidates is 4. From 3 GHz to 6 GHz, a quantity of SSB candidates is κ. Above 6 GHz, a quantity of SSB candidates is 64. At one SSB candidate location, the base station may send a plurality of SSBs in a frequency division manner. The SSB sent by the base station is periodically repeated, and a period size is configurable. For an SSB used for access of the UE, a typical value of a period is 20 milliseconds (ms). The following five cases are included.

Case A: For a subcarrier spacing of 15 kHz, the SSB is sent according to {2, 8}+14×n, where {2, 8}+14×n indicates an index, namely, a location, of a first symbol of the SS/PBCH block. The rest can be deduced by analogy, and details are not described again. For a frequency band less than or equal to 3 GHz, n=0 or 1. For a frequency band greater than 3 GHz and less than or equal to 6 GHz, n=0, 1, 2, or 3. A location of an SS/PBCH block in one synchronization signal period is obtained by traversing the foregoing values of n by using the foregoing formula. The rest can be deduced by analogy, and details are not described again.

Case B: For a subcarrier spacing of 30 kHz, the SSB is sent according to {4, 8, 16, 20}+28×n. For a frequency band less than or equal to 3 GHz, n=0. For a frequency band greater than 3 GHz and less than or equal to 6 GHz, n=0 or 1.

Case C: For a subcarrier spacing of 30 kHz, the SSB is sent according to {2, 8}+14×n. For a frequency band less than 3 GHz or equal to 3 GHz, n=0 or 1. For a frequency band greater than 3 GHz and less than or equal to 6 GHz, n=0, 1, 2, or 3.

Case D: For a subcarrier spacing of 120 kHz, the SSB is sent according to {4, 8, 16, 20}+28×n. For a frequency band greater than 6 GHz, n=0, 1, 2, 3, 5, 6, 7, 8, 10, 11, 12, 13, 15, 16, 17, or 18.

Case E: For a subcarrier spacing of 240 kHz, the SSB is sent according to {8, 12, 16, 20, 32, 36, 40, 44}+56×n. For a frequency band greater than 6 GHz, n=0, 1, 2, 3, 5, 6, 7, or 8.

It should be understood that the foregoing five cases describe candidate locations at which the SSB is sent or measured in the half-frame at different subcarrier spacings. However, in actual implementation, a quantity of SSBs sent by the base station or the network node in the half-frame may be less than a quantity of SSB candidate locations. This depends on implementation of the base station or the network node. For ease of description, the candidate locations of the SSB in the half-frame are referred to as all SSB candidate locations, and a set of candidate locations of SSBs sent by the first node to implement coverage is referred to as a first candidate location of the SSB. Herein, implementing coverage indicates that the SSB sent by the base station or the network node may enable UE and/or an IAB node within a specific range to perform cell search. The specific range includes a designed coverage area of the base station or the network device.

It should be understood that the first candidate location of the SSB includes all the SSB candidate locations in the half-frame, or a subset of all the SSB candidate locations. The foregoing concepts or definitions are not described in the following sections. In a possible implementation, the IAB node reports the first candidate location of the SSB to the parent node. In another possible implementation, the IAB node reports a requirement on a quantity of first candidate locations of the SSB to the parent node, and the parent node configures the first candidate location of the SSB for the IAB node.

Figure 2:
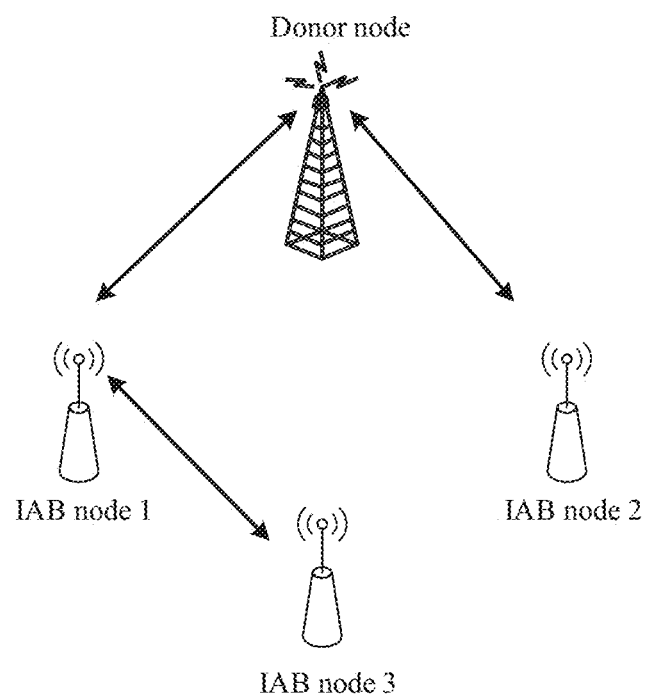
FIG. 2 is an example of a possible network topology of an NR relay system according to an embodiment of this application.

FIG. 2 is an example of a possible network topology of an NR relay system. The network topology includes three IAB nodes, namely, an IAB node 1, an IAB node 2, an IAB node 3, and a donor node. Each node in FIG. 2 sends an SSB for UE to detect a synchronization signal, to implement cell camping or access. In this application, an SSB that may be used by the UE to perform initial access by each node in FIG. 2 is referred to as an access (AC) SSB. In some scenarios, the AC SSB is also referred to as a cell-defining SSB (CD SSB).

A first node determines a first candidate location of the AC SSB based on factors such as a coverage target and hardware implementation, and sends the AC SSB based on the first candidate location of the AC SSB. In a possible implementation, the first node sends the AC SSB at all SSB candidate locations, that is, a first candidate location of an SSB is all the SSB candidate locations. In another possible implementation, the first node sends the AC SSB at some SSB candidate locations, that is, a first candidate location of an SSB is a subset of all the SSB candidate locations.

The AC SSB is sent at a frequency defined by a synchronization raster. It should be understood that the frequency is a center frequency of the synchronization raster, and the AC SSB is actually sent within a specific frequency range of the synchronization raster. The SSB may also be sent on a frequency other than the synchronization raster, and the frequency other than the synchronization raster refers to a frequency range that has a specific frequency offset relative to the synchronization raster. Generally, an SSB sent at the synchronization raster is referred to as an on raster SSB, and an SSB sent at a deviation from the synchronization raster is referred to as an off raster SSB. Generally, the UE performs initial access by using the on raster SSB, and performs measurement such as RRM by using the on raster SSB and/or the off raster SSB.

Figure 3:
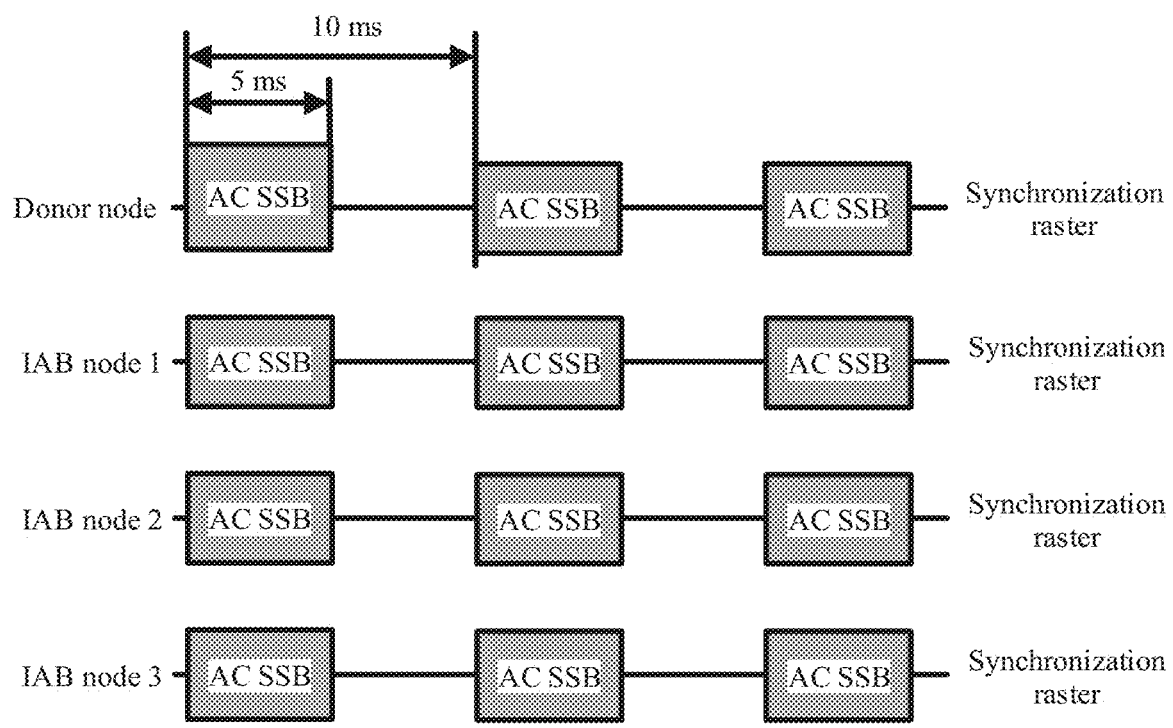
FIG. 3 is a schematic diagram of sending an on raster SSB by four nodes according to an embodiment of this application.

FIG. 3 is a schematic diagram of sending the on raster SSB by the four nodes in FIG. 2. An AC SSB of each node is sent within a half-frame, in other words, the AC SSB is sent within 5 ms. A sending period of the AC SSB is 10 ms. It is assumed that synchronization rasters of the four nodes are the same. It should be understood that, this application does not impose a limitation that synchronization rasters of different nodes in actual implementation need to be the same.

In an IAB system, because an TAB node is wirelessly connected to a parent node. From a perspective of a direct parent node of the IAB node, the TAB node is used as UE of the direct parent node. Therefore, the JAB node needs to receive an AC SSB sent by the direct parent node. Simultaneously, the IAB node needs to provide a service for the UE. Therefore, the IAB node also needs to send an AC SSB.

A half-duplex constraint of the IAB node is considered, and the IAB node cannot simultaneously send and receive the SSBs. Therefore, to receive, on a backhaul link, the AC SSB sent by the parent node or an AC SSB sent by a remaining node, the JAB node needs to stop sending the AC SSB at some locations. However, if the TAB node stops sending at a location of the AC SSB, measurement and/or access of the UE served by the IAB node may be affected. Therefore, to avoid impact on the AC SSB, an additional backhaul (BH) SSB is introduced for the IAB node to discover and measure the remaining node. Because the BH SSB is not used for initial access of the UE, stopping sending the BH SSB by the IAB node when the AB node measures the BH SSB does not affect the UE.

To prevent the UE from detecting the BH SSB, time division multiplexing, frequency division multiplexing, code division multiplexing, or time-frequency division multiplexing may be performed on the BH SSB and the AC SSB. Specific designs of the AC SSB and the BH SSB are not limited in this application. In this application, measurement of the backhaul link includes measurement performed by the IAB node on a remaining network node, and the remaining network node includes a donor base station, a base station, and a remaining IAB node.

When the BH SSB is used by the remaining node to discover the first node, the first node sends the BH SSB at the first candidate location of the SSB. In a possible implementation, there is a correspondence between a first candidate location of the BH SSB of the first node and the first candidate location of the AC SSB of the first node. For example, a quantity of first candidate locations of the BH SSB is the same as a quantity of first candidate locations of the AC SSB. For another example, for a same SSB index, there is a QCL relationship between the BH SSB and the AC SSB that are sent by the first node. It should be noted that a candidate location that is of the SSB and at which the AC SSB is sent and a candidate location that is of the SSB and at which the BH SSB is sent may have a same symbol index. However, the two may be located in different half-frames, that is, time division multiplexing is performed on both the AC SSB and the BH SSB.

Specifically, the BH SSB and the AC SSB are placed at different time domain locations, that is, time division multiplexing is performed on the BH SSB and the AC SSB. For example, the BH SSB and the AC SSB are staggered in symbols or slots. Alternatively, the BH SSB may be configured as the off raster, that is, the AC SSB and the BH SSB are staggered in frequency domain. Alternatively, a PSS of the BH SSB may use a sequence different from that of a conventional PSS, that is, code division.

Figure 4:
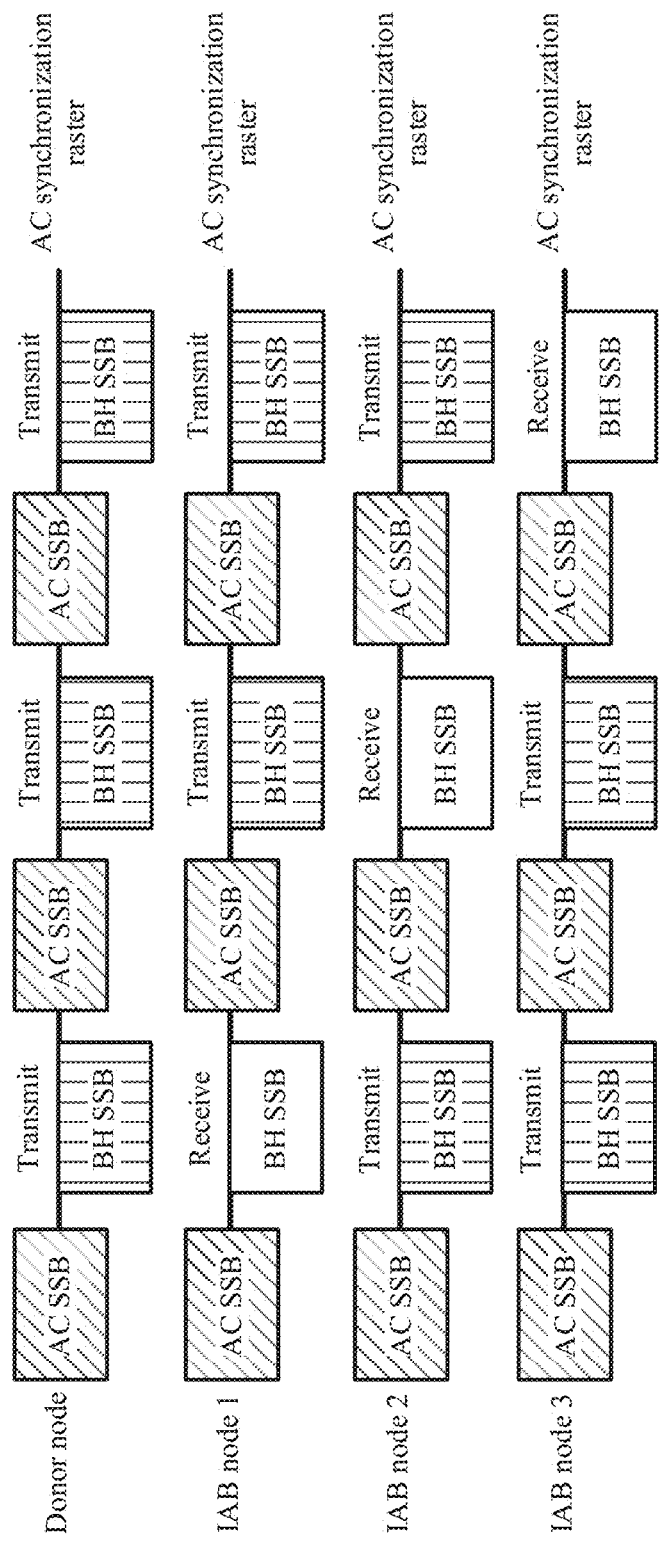
FIG. 4 is a schematic diagram of sending an AC SSB and a BH SSB according to an embodiment of this application.

In a possible implementation, the BH SSB and the AC SSB may be distinguished by using a combination of time division multiplexing and frequency division/code division multiplexing. Specifically, the BH SSB and the AC SSB first avoid a sending and receiving conflict of the JAB node through time division multiplexing, and then prevent, through frequency division and/or code division multiplexing, the initially accessed UE from mistakenly detecting the BH SSB. It is assumed that the BH SSB uses an off-raster configuration, and time division multiplexing (time-frequency division) is performed on the BH SSB and the AC SSB. In this case, a structure shown in FIG. 4 may be obtained. In FIG. 4, when measuring the BH SSB, the AB node stops sending the BH SSB.

In FIG. 4, it is assumed that a BH SSB period is the same as an AC SSB period. It should be understood that this is merely an example. In actual implementation, the BH SSB period and the AC SSB period may be different. For example, the BH SSB may have a larger period. In FIG. 4, the BH SSB period includes sending and measurement of the BH SSB. A BH SSB measurement period of each node is longer than a BH SSB period of each node. For example, in FIG. 4, because the three TAB nodes need to measure each other, a measurement period of the BH SSB is three times that of a BH SSB period.

For the sending or the measurement of the BH SSB, additional time-frequency resources are required to transmit the BH SSB or measure the BH SSB. Therefore, the transmission of the BH SSB and the measurement of the BH SSB causes extra overheads. Alternatively, even if no BH SSB is introduced, when the AC SSB is used to measure an adjacent IAB node, relatively large overheads are also caused. Therefore, how to reduce overheads for sending the SSB or overheads for measuring the SSB to optimize IAB system performance needs to be considered.

In an example of this application, the SSB is mainly used by the IAB node to discover and measure the remaining node. However, this application does not exclude that the SSB is used for another purpose, for example, initial access, beam management, or beam recovery.

In a possible implementation, one TAB node includes a plurality of cells or sectors, and each cell or sector of the AB node independently sends the SSB. The solution in this application may be independently applied to each cell or sector.

To resolve the foregoing problem, this embodiment uses a measurement signal configuration method. The method is applied to a wireless relay system. The wireless relay system includes at least a first node and a second node, the first node is an JAB node or a donor base station, and the second node is an JAB node. The method includes: The first node sends a synchronization signal block SSB at a first candidate location of the synchronization signal block SSB. The synchronization signal block SSB is used by the second node to discover or detect the first node. The first candidate location of the SSB includes a set of candidate locations of SSBs sent by the first node to implement coverage. The first node receives SSB optimization configuration information. The SSB optimization configuration information includes an identifier or a number of the SSB. The first node determines a synchronization signal block SSB sending subset based on the SSB optimization configuration information. The sending subset includes some synchronization signal block SSB candidate locations.

Further, the first node can reactivate to send the SSB at the first candidate location of the SSB. That the first node reactivates to send the SSB at the first candidate location of the SSB includes: The first node periodically activates to send the SSB at the first candidate location of the SSB. Alternatively, the first node sends the SSB at the first candidate location of the SSB based on a fact that the first node detects an event that meets a condition. Alternatively, the first node receives an SSB activation indication sent by the donor base station, where the SSB activation indication is used to indicate the first node to send the SSB at the first candidate location of the SSB.

In a case in which the SSB needs to be measured, the second node is used as an example, and the second node performs SSB measurement at all synchronization signal block SSB candidate locations. The synchronization signal block SSB is used by the second node to discover or measure the first node. The second node sends an SSB optimization configuration information to the donor base station or the first node. The SSB measurement result includes an identifier or a number of the SSB. The second node receives a backhaul SSB measurement configuration indication. The backhaul SSB measurement configuration indication includes a subset of all SSB candidate locations of the first node. The second node measures a backhaul SSB according to the measurement indication.

The second node reactivates to measure the SSB at all the SSB candidate locations. That the second node reactivates to measure the SSB at all the SSB candidate locations includes: The second node periodically activates to measure the SSB at all the SSB candidate locations. Alternatively, the second node measures the SSB at all the SSB candidate locations based on a fact that the second node detects an event that meets a condition. Alternatively, the second node receives an SSB activation indication sent by the donor base station, where the SSB activation indication is used to indicate the second node to measure the SSB at all the SSB candidate locations.

Figure 5:
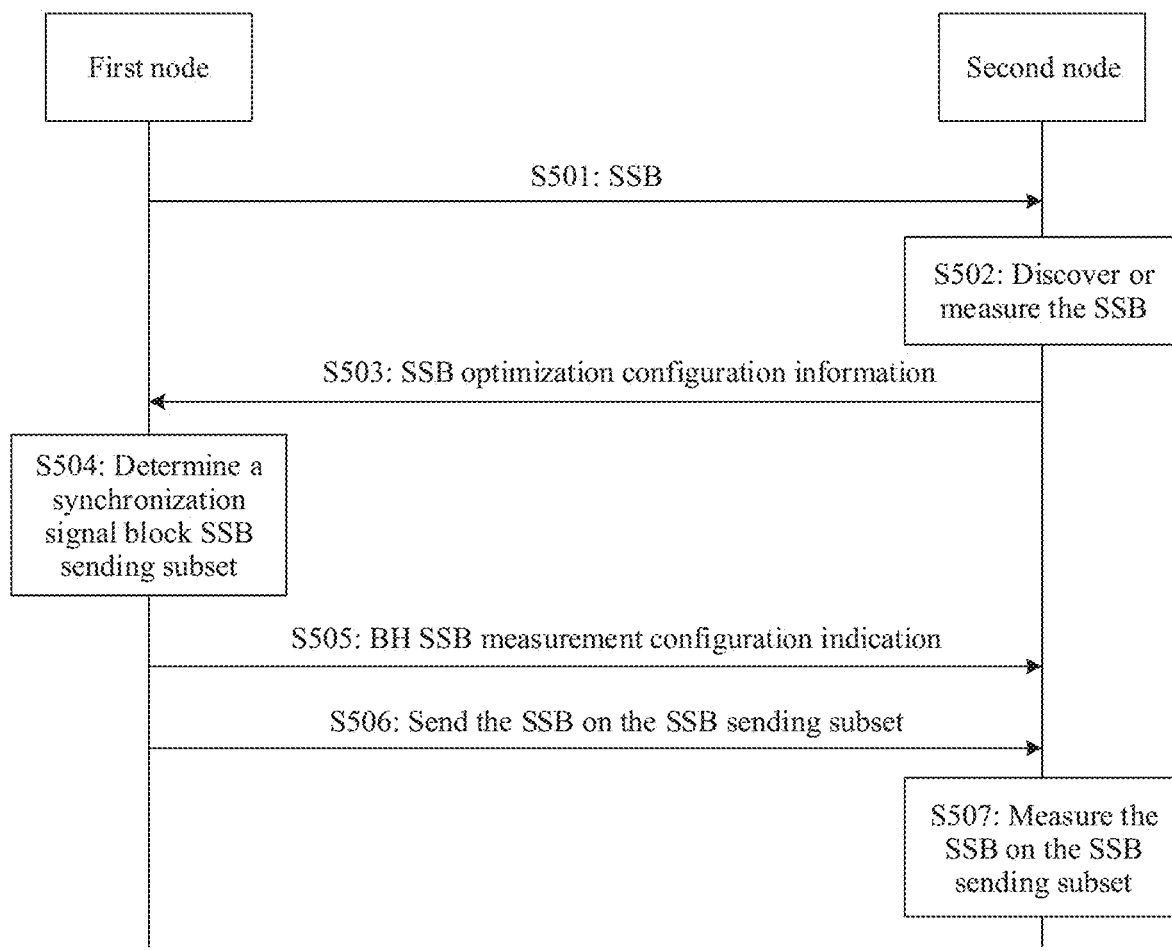
FIG. 5 is a flowchart of SSB sending and SSB measurement performed by a first node and a second node according to an embodiment of this application.

FIG. 5 is a flowchart of SSB sending and SSB measurement performed by a first node and a second node according to an embodiment of this application. In FIG. 5, the first node may be an IAB node, or may be a base station, for example, a donor base station or an NR base station. In this application, for ease of description, the first node is uniformly used for description, and it should not be understood that the first node is merely the IAB node. The second node is an IAB node. The second node is a child node of the first node.

In FIG. 5, the SSB may be a backhaul SSB, namely, a BH SSB. However, it should not be understood that the SSB includes only the BH SSB, and the SSB may alternatively be an access SSB, namely, an AC SSB. Details are described below.

S501: The first node sends a synchronization signal block SSB at a first candidate location of the SSB. The synchronization signal block SSB is used by the second node to discover the first node or measure an SSB of the first node.

The first candidate location of the synchronization signal block SSB includes a set of candidate locations of SSBs sent by the first node to meet a coverage requirement. The candidate location may include a time domain location, a frequency domain location, or a time-frequency domain location. Meeting the coverage requirement includes that the first node can meet a maximum coverage area or a partial coverage area. The maximum coverage area or the partial coverage area depends on a configuration of the first node. This is not limited in this application. For example, if the first node needs to meet only a part of the maximum coverage range that can be implemented by the first node, the first node does not need to send the SSB at all SSB candidate locations, but only needs to send the SSB at some SSB locations. Specific implementation is not limited in this application.

The AC SSB is used as an example. As described above, for different frequency bands, quantities of AC SSBs sent by the first node or the second node are different, and the AC SSBs are sent within a specified frequency domain range. In NR, based on different subcarrier spacings, quantities of SSBs are different, and symbol locations of the SSBs in a radio frame are also different. Details are not described again.

It should be understood that for the backhaul SSB, different time domain, frequency domain, or time-frequency domain locations may also be defined to send the SSB. A method is described above, and details are not described again. Regardless of the AC SSB or the BH SSB, the first candidate location of the SSB can ensure that a synchronization signal can be received by UEs or child nodes at different locations in a coverage area that is satisfied by the first node. In NR, cell coverage is implemented through beam scanning. Because a quantity of beams that are simultaneously sent is limited, cell coverage needs to be implemented in a time division manner. Synchronization signals sent at different time domain locations are referred to as candidate locations of the SSB. Quantities of candidate locations at different subcarrier spacings are described above. Details are not described again.

To ensure that UE, a child node, or a neighboring node in a cell discovers or measures the first node or the second node, the SSB needs to be periodically sent. For example, a synchronization signal is sent once every 20 ms. Sending the synchronization signal herein means sending the synchronization signal at the first candidate location of the SSB. For ease of description, in this application, the period is referred to as a first SSB period. In other words, the first SSB period is a time interval between two consecutive times of sending the SSB at the first candidate location of the SSB.

Figure 6:
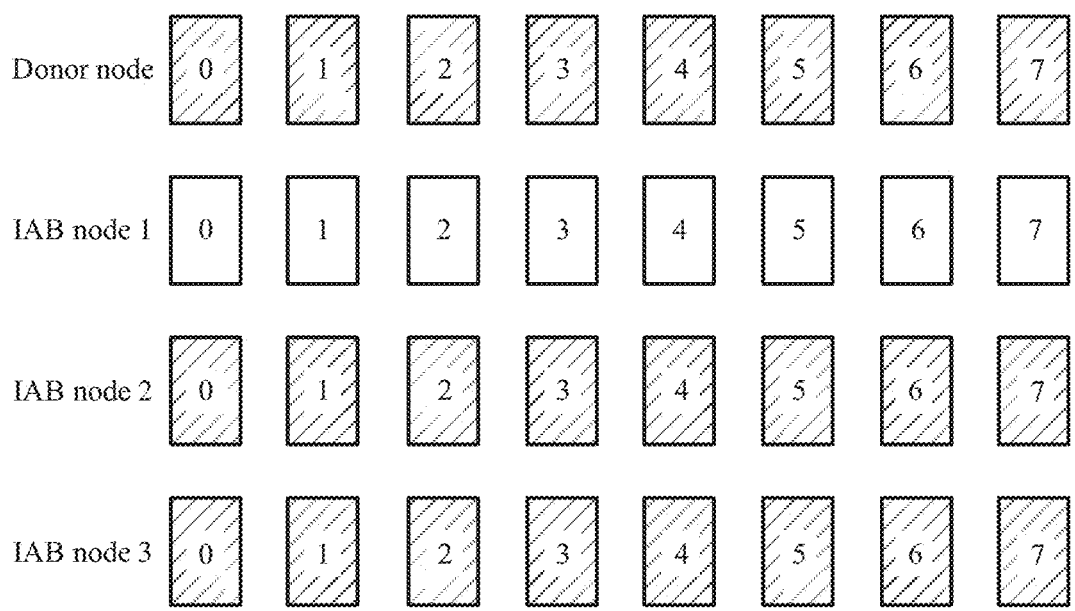
FIG. 6 is a schematic diagram of sending and measurement performed by each node at a first candidate location of an SSB according to an embodiment of this application.

FIG. 6 is a schematic diagram of sending and measurement performed by each node at the first candidate location of the SSB according to an embodiment of this application. In FIG. 6, eight candidate locations of the SSB are used as an example. The first candidate location of the SSB includes all the eight SSB candidate locations. Eight candidate SSBs are sent or measured in a half-frame of 5 ms within one period. The donor node, the IAB node 2, and the IAB node 3 are transmit nodes, and the IAB node 1 measures the donor node, the IAB node 2, and the IAB node 3. For the IAB node 1, SSBs sent by all nodes are measured once within 5 ms, that is, an SSB of another node is measured at each SSB candidate location. Whether an SSB signal sent by the another node can be measured depends on whether the IAB node 1 can receive a signal from the another node. It should be understood that, in FIG. 6, shadows in the donor node, the IAB node 2, and the IAB node 3 only indicate that the three nodes send SSBs at candidate locations of the SSBs, but does not indicate that the SSBs sent by the three nodes are the same. The node donor, the AB node 2, and the JAB node 3 may send different SSBs.

In this application, that one IAB node, for example, the IAB node 2, can measure or discover another node, for example, the IAB node 1, means that a measurement result meets a preset condition. The preset condition includes one or more of the following conditions: the IAB node 1 successfully decodes a PBCH sent by the AB node 2, the AB node successfully identifies a PCI of the IAB node 2, and RSRP/RSRQ/an SINR measured by the IAB node 1 is greater than a threshold.

S502: The second node measures a synchronization signal block SSB at all synchronization signal block SSB candidate locations.

As described above, the second node measures the first candidate location of the SSB. A new node may be discovered by measuring the SSB at the first candidate location of the SSB, or a discovered node may be measured, to obtain channel quality of the discovered or measured node.

It should specially be noted that when the second node discovers or measures the first candidate location of the SSB, the first candidate location of the SSB is usually all SSB candidate locations. Because the second node does not know a location at which the base station or the first node sends the SSB, a candidate location at which the SSB can be measured can be obtained only by measuring all the SSB candidate locations.

If the second node can measure the SSB sent by the another node, the second node may obtain quality of a channel and node information between the second node and the node that sends the SSB. The node information includes a physical cell identifier (PCI) of the node and an identifier or a number of the SSB. The identifier of the SSB is an index determined by using a DM-RS and a PBCH payload as described above. Details are not described again.

Figure 7:
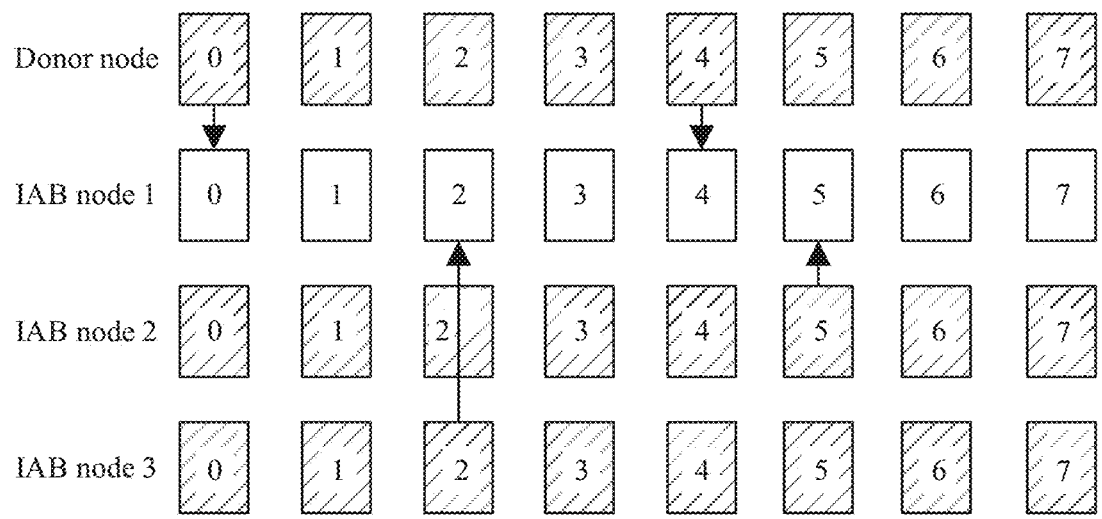
FIG. 7 is a schematic diagram of a possible result of measuring an SSB of another node by a first node according to an embodiment of this application.

FIG. 7 is a schematic diagram of a possible result of measuring the SSB of the another node by the IAB node 1 in FIG. 6. An arrow in FIG. 7 indicates that the AB node 1 can measure an SSB of a corresponding node. For example, an SSB 0 of the donor node may be measured at a location of SSB 0. An SSB 4 of the donor node may be measured at a location of SSB 4. An SSB 2 of the IAB node 3 can be measured at a location of SSB 2. An SSB 5 of the IAB node 2 can be measured at a location of SSB 5.

S503: The second node sends SSB optimization configuration information.

After completing SSB discovery or measurement, the second node sends the SSB optimization configuration information. After step S502, the second node may obtain a measurement result. After the first node sends the SSB, to reduce overheads and optimize sending of the SSB, the first node needs to know a location at which a child node can measure the SSB, or needs to know a direction in which the SSB needs to be continuously sent.

The first node may obtain the SSB optimization configuration information in two manners.

In a first manner, the SSB optimization configuration information is directly received from the second node. If the first node directly receives the SSB optimization configuration information from the second node, the SSB optimization configuration information includes the identifier or the number of the SSB obtained by the second node by measuring the SSB of the first node. The SSB optimization configuration information may further include at least one of an identifier of the second node, reference signal received power RSRP or a signal-to-interference ratio (SINR) of the measured SSB, an identifier of the first node, and a backhaul SSB configuration indication. It should be understood that the measurement result of the second node may alternatively be another parameter. In this application, only the RSRP or the SINR is used as an example. In a possible implementation, the donor node or the first node configures an RSRP or SINR threshold for the second node. Only when RSRP or an SINR measured by the second node is greater than the threshold, the second node sends the SSB optimization configuration information to the donor node or the first node. The SSB optimization configuration information includes: reporting the measurement result.

In a possible implementation, the SSB optimization configuration information sent by the second node further includes an identifier of a receive beam used for the measurement. The receive beam identifier may be a reference signal or an SSB identifier of a parent node or a remaining node. Alternatively, the receive beam identifier may be a reference signal identifier sent by the second node. For example, the second node uses a number of an SSB sent by the second node to represent the receive beam. It indicates that a receive beam used by the second node for the measurement is the same as or close to a transmit beam of the SSB sent by the second node. In other words, a spatial domain filter used by the second node for the measurement is the same as a spatial domain transmission filter used by the SSB sent by the second node.

When the first node is the donor base station, the first manner is usually used. When the first node is a relay node, whether to directly receive the SSB optimization configuration information of the second node depends on a standard definition. This is not limited in this application.

In a second manner, the first node receives the SSB optimization configuration information from the donor base station. In this case, the SSB optimization configuration information includes at least two configuration manners.

In a first configuration manner, the SSB optimization configuration information includes a measurement result of the SSB sent by one or more second nodes to the first node. In the first configuration manner, the donor base station receives, from a plurality of second nodes, the SSB optimization configuration information sent by the second node. The SSB optimization configuration information sent by the second node to the donor base station is mainly a result of measuring or discovering the SSB by the second node. Information about the SSB is described above, and details are not described again.

In a second configuration manner, the SSB optimization configuration information includes a backhaul SSB measurement configuration indication. The backhaul SSB measurement configuration indication includes at least one of the SSB identifier, an SSB switch indication, and SSB mode information. In the second configuration manner, the donor base station has processed an SSB measurement and the discovery result of one or more second nodes, and directly configures, for the first node, SSB candidate locations at which the SSB needs to be sent. Therefore, the SSB identifier is mainly used to indicate an SSB that can be sent or an SSB that can be disabled. The SSB switch indication is used to indicate whether an SSB at a candidate location corresponding to a corresponding SSB identifier is to be sent or not to be sent. It should be understood that the SSB identifier herein may be an index of the SSB, or may be indicated by using a bit mapping string. This is not limited in this application.

The SSB mode information includes at least one of an indication indicating whether SSBs sent in half-frames of the SSBs are the same, an SSB measurement period, and an SSB mode. The SSB mode represents a set of candidate locations at which the SSB is sent or received in the half-frame.

Figure 8:
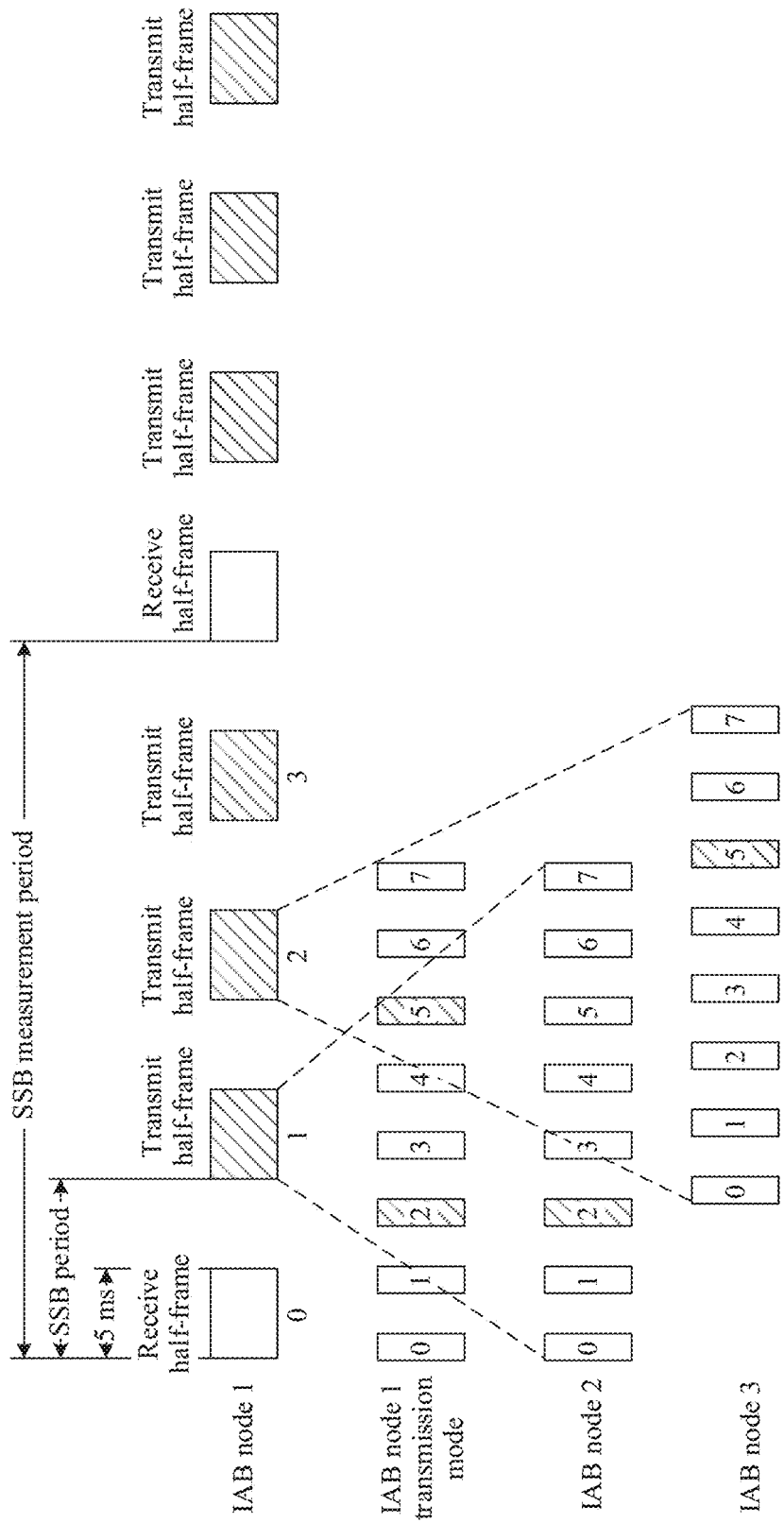
FIG. 8 is a schematic diagram of an SSB mode according to an embodiment of this application.

FIG. 8 is an example of the SSB mode according to an embodiment of this application. It should be understood that the SSB mode is described herein only as an example. In FIG. 8, sending by the TAB node 1 is used as an example. The AB node 2 and the AB node 3 separately perform measurement in a transmit half-frame 1 and a transmit half-frame 2 of the TAB node 1.

In FIG. 8, it is assumed that the IAB node 2 receives an SSB sent by the IAB node 1 at an SSB 2 in the transmit half-frame 1 of the IAB node 1, and the TAB node 3 receives the SSB sent by the IAB node 1 at an SSB 5 in the transmit half-frame 2 of the IAB node 1. A receive half-frame and a transmit half-frame each is 5 ms. A time difference between two adjacent transmit half-frames or between a receive half-frame and an adjacent transmit half-frame is an SSB period, for example, 20 ms. A time difference between two adjacent receive half-frames of the IAB node 1 is an SSB measurement period. That each receive half-frame or each transmit half-frame has eight SSB candidate locations is used as an example.

The IAB node 1 sends the SSB in each transmit half-frame, for example, transmit half-frames 1, 2, and 3 in FIG. 8 in a same SSB mode. To ensure that the IAB node 2 and the IAB node 3 each can receive the SSB, the IAB node 1 sends the SSB in candidate SSB locations 2 and 5 of each transmit half-frame, and does not send the SSB in other candidate SSB locations such as the SSB 0, an SSB 1, an SSB 3, an SSB 4, an SSB 6, and an SSB 7 in the figure.

When the SSB mode sent by the TAB node in each transmit half-frame is the same, the candidate location at which the SSB is sent are a union set of SSB candidate locations measured by all adjacent IAB nodes. As shown in FIG. 8, the SSB sent by the IAB node 1 in each transmit half-frame is a union set of an SSB candidate location 2 of the IAB node 2 and an SSB candidate location 5 of the IAB node 3.

The same mode used by each transmit half-frame can reduce signaling overheads. However, this also increases sending overheads. For example, in FIG. 8, configurations on the TAB node 2 and the IAB node 3 are the same. However, there is no node to receive an SSB sent at the candidate location 5 in the transmit half-frame 1, so that a waste is caused. When the donor node configures the IAB node 1, only one mode needs to be configured.

It should be understood that FIG. 8 is described from a perspective of the transmit half-frame, and is similar from a perspective of the receive half-frame. Details are not described again. From a perspective of the receive node, whether to perform receiving at another SSB candidate location depends on implementation. This is not limited in this application.

Figure 9:
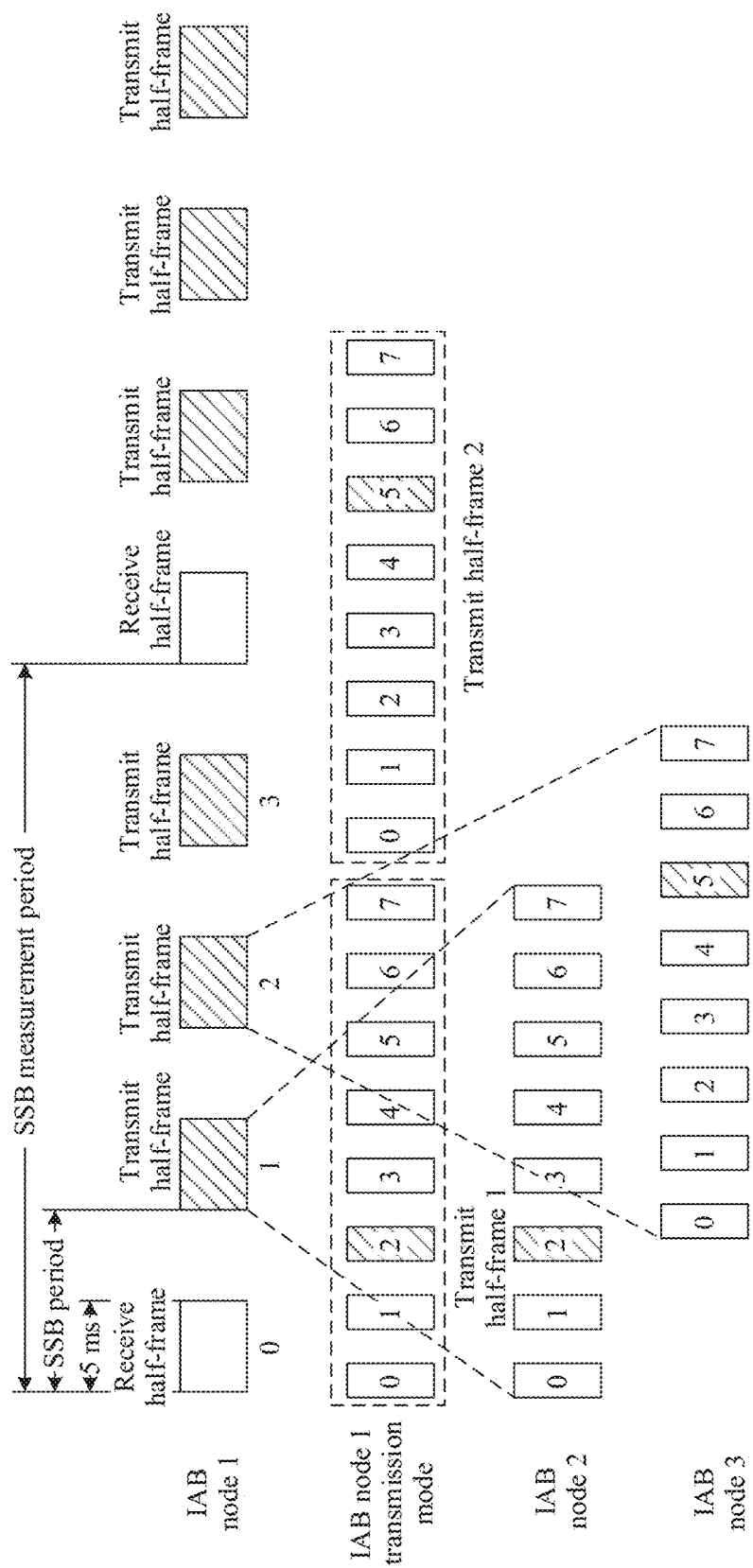
FIG. 9 is a schematic diagram of using different transmit modes in each transmit half-frame according to an embodiment of this application.

To further reduce overheads for sending the SSB or overheads for measuring the SSB, further optimization may be performed based on the manner in FIG. 8. Each transmit half-frame uses a different mode. In other words, each transmit half-frame is sent according to a requirement of an actual receive node. FIG. 9 is a schematic diagram of using different transmit modes in each transmit half-frame according to an embodiment of this application. It should be understood that FIG. 9 is merely an example, and is similar to a receive mode. Details are not described below again.

In FIG. 9, it is assumed that the IAB node 2 receives an SSB sent by the IAB node 1 at an SSB 2 in the transmit half-frame 1 of the IAB node 1, and the IAB node 3 receives the SSB sent by the TAB node 1 at an SSB 5 in the transmit half-frame 2 of the TAB node 1. A receive half-frame and a transmit half-frame each is 5 ms. A time difference between two adjacent transmit half-frames or between a receive half-frame and an adjacent transmit half-frame is an SSB period, for example, 20 ms. A time difference between two adjacent receive half-frames of the JAB node 1 is an SSB measurement period. That each receive half-frame or each transmit half-frame has eight SSB candidate locations is used as an example.

In FIG. 9, the IAB node 1 has different transmit modes in the transmit half-frame 1 and the transmit half-frame 2. In the transmit half-frame 1, because only the IAB node 2 receives the SSB 2, the IAB node 1 sends the SSB only in the SSB candidate location 2 in the transmit half-frame 1. Similarly, the IAB node 1 sends the SSB only in the candidate SSB location 5 in the transmit half-frame 2. The TAB node 1 has different SSB transmit modes in the transmit half-frame 1 and the transmit half-frame 2.

The method shown in FIG. 9 is used to perform SSB sending or SSB measurement, so that overheads for sending the SSB or overheads for measuring the SSB can further be reduced.

In FIG. 8 and FIG. 9, when the IAB node 1 sends the SSB, the SSB is still sent based on a location of each receive node. In this way, resources for sending the SSB by the IAB node 1 are discrete. Because each SSB occupies four symbols, when a subcarrier spacing is relatively large, one slot includes a relatively large quantity of symbols, and discrete SSBs cause resource discreteness. This is not conducive to full utilization of resources. If receiving needs to be performed at a middle of two SSBs, because of receive/transmit conversion of a transceiver, a specific quantity of symbols need to be wasted. This causes resource consumption and is not conducive to full utilization of resources.

Figure 10:
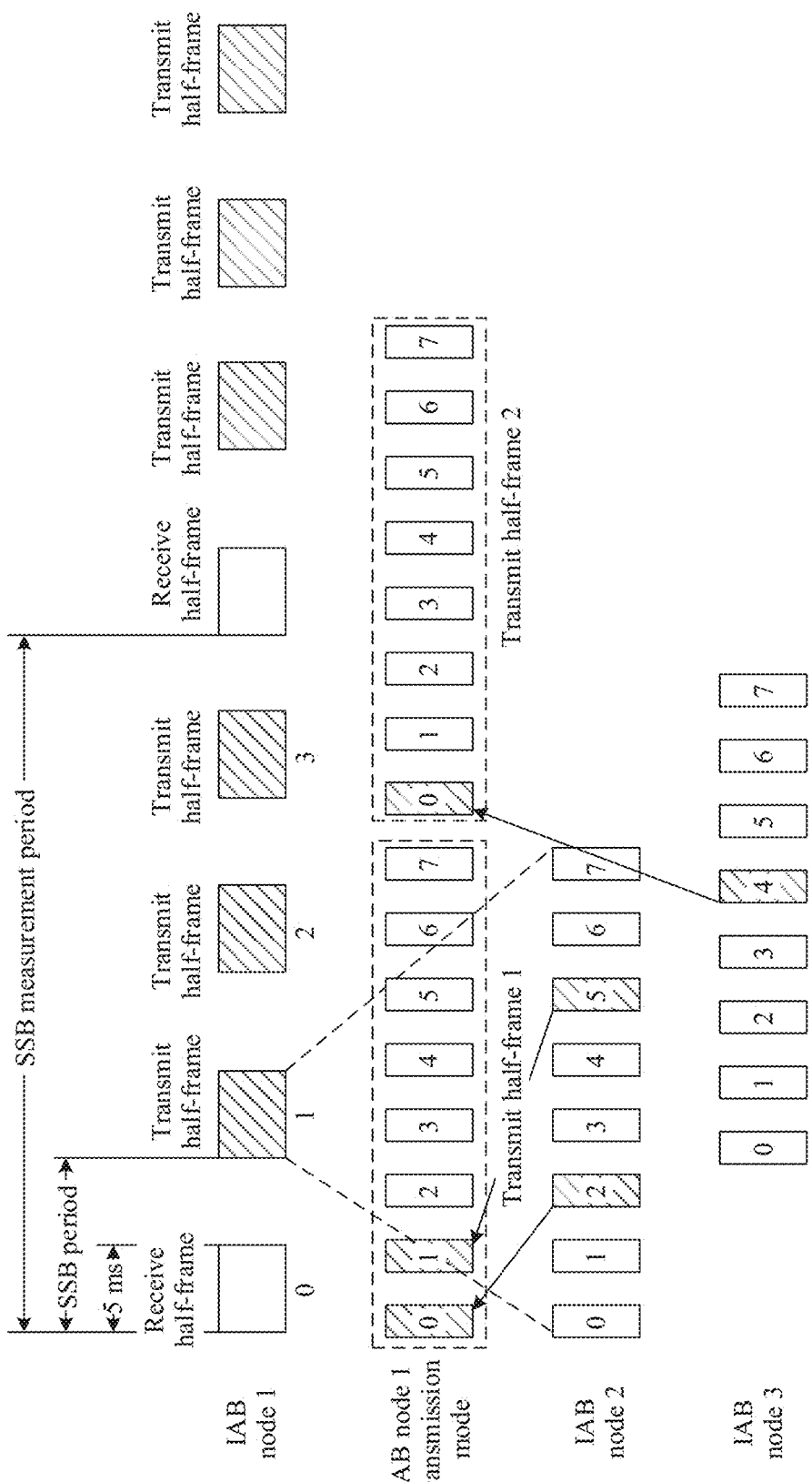
FIG. 10 is a measurement signaling configuration method for supporting different measurement windows according to an embodiment of this application.

To further optimize sending of the SSB. FIG. 10 shows another measurement signaling configuration method according to an embodiment of this application. SSBs that need to be sent are sent in a centralized manner by adjusting SSB candidate locations in each half-frame. A method for receiving the SSB is similar. Sending of the SSB is used as an example below, and receiving of the SSB is not described in detail again.

In FIG. 10, the receive half-frame or the transmit half-frame and a period configuration are the same as those in FIG. 8 or FIG. 9. Details are not described again.

In FIG. 10, it is assumed that the IAB node 1 performs sending, the TAB node 2 performs measurement in the transmit half-frame 1 of the IAB node 1, and the IAB node 3 performs measurement in the transmit half-frame 2 of the TAB node 1. In addition, it is assumed that the TAB node 2 measures the SSB at the SSB candidate locations 2 and 5, and the IAB node 3 measures an SSB at an SSB candidate location 4.

To prevent the sent SSB from forming discrete symbols on a frame structure of the AB node 1, the IAB node 1 may adjust the SSB candidate locations 2 and 5 to SSB candidate locations 0 and 1 for sending. However, it should be understood that directions of SSBs sent by the IAB node 1 at the SSB candidate locations 0 and 1 need to be respectively corresponding to directions of SSBs originally sent at the SSB candidate locations 2 and 5. Otherwise, the IAB node 2 may not receive, in the original direction, the SSB sent by the IAB node 1. That is, the IAB node 1 only adjusts the SSB candidate location.

Similarly, in the transmit half-frame 2, the TAB node 1 adjusts the original SSB candidate location 4 to the SSB candidate location 0 for sending, and a sending direction keeps consistent with that of the original SSB candidate location 4.

It should be understood that the foregoing adjustment of the candidate location at which the SSB is sent may be performed by the TAB node 1, or may be configured by the donor node. This specifically depends on a definition in a protocol, and is not limited in this application.

To ensure that a receive end can normally measure the SSB, the IAB node 1 or the donor node needs to notify the receive end of adjustment performed by a transmit end, and send, to the receive end, a correspondence between a corresponding location after the adjustment and an SSB candidate location before the adjustment. For example, the donor node configures the IAB node 1 to adjust the SSB candidate locations 2 and 5 to the SSB candidate locations 0 and 1 respectively, and notifies the node IAB node 2 of corresponding adjustment. In other words, the SSB candidate location 2 is adjusted to the SSB candidate location 0, and the SSB candidate location 5 is adjusted to the SSB candidate location 1. A similar configuration is performed on the IAB node 3. Details are not described herein again.

It should be understood that the foregoing description is provided by using an example in which the different SSB transmit modes are used in each half-frame of the IAB node 1. It is similar to sending the SSB in all transmit half-frames in a same SSB transmit mode.

To implement the adjustment of sending the SSB in FIG. 10, the SSB optimization configuration information may further include at least one of the SSB candidate location adjustment indication and an SSB candidate location mapping relationship. The SSB candidate location mapping relationship is used to indicate a correspondence between an SSB candidate location before the adjustment and an SSB candidate location after the adjustment. A method is described above, and details are not described again.

According to the foregoing different SSB transmit modes or SSB receive modes, overheads for sending the SSB by the IAB node or overheads for measuring the SSB by the IAB node can be reduced, thereby improving system resource utilization of the IAB node.

Alternatively, the backhaul SSB configuration indication may directly include content included in SSB mode information in the backhaul SSB configuration indication, and the SSB mode information is not required. The SSB mode information is only a name of a parameter set for ease of description.

It should be understood that the SSB optimization configuration information is received from the second node in step S503. The first node also receives the SSB optimization configuration information from the donor base station. If the first node is the donor base station, the first node receives the SSB optimization configuration information of the second node. In this case, the SSB optimization configuration information includes the measurement result of the second node.

S504: The first node determines a synchronization signal block SSB sending subset.

After receiving the SSB optimization configuration information sent by the second node or the donor base station, the first node determines an SSB candidate location at which the SSB needs to be sent. Generally, the SSB candidate location at which the SSB needs to be sent is a subset of all SSB candidate locations of the first node. In a possible case, the first node may need to send an SSB at a first candidate location of the SSB in a half-frame. However, the SSB may not need to be sent at first candidate locations of SSBs in all transmit half-frames. This specifically depends on a configuration of the SSB transmit mode. This is not limited in this application.

S505: The first node sends a backhaul SSB (BH SSB) measurement configuration indication. The backhaul SSB measurement configuration indication includes the subset of all the SSB candidate locations of the first node.

After determining the SSB sending subset, the first node may send the determined SSB sending subset to the second node. The first node may send the BH SSB measurement configuration indication to the second node by using a plurality of methods. Details are as follows.

In a first manner, the first node directly sends the backhaul SSB measurement configuration indication to the second node. If the SSB optimization configuration information is directly received from the second node, the first node may directly send the BH SSB measurement configuration indication to the second node.

In a second manner, the first node sends information about the determined SSB sending subset to the donor base station, and the donor base station sends the BH SSB measurement configuration indication to the second node. If the donor base station directly sends the measurement result of the one or more second nodes to the first node, after determining the SSB sending subset, the first node should send the determined sending subset to the donor base station, and indicate information about sending subsets configured for different second nodes. Then, the donor base station sends, to the second node by using the BH SSB measurement configuration indication, the sending subset determined by the first node. The donor base station may process the sending subset of the first node, or may directly send the sending subset to the second node. This depends on specific implementation. This is not limited in this application.

As described above, the first node may directly receive configuration information of the SSB sending subset from the donor base station. In other words, the SSB optimization configuration information is sent by the donor base station to the first node, and directly indicates the SSB sending subset of the first node. In this case, the donor base station sends the BH SSB measurement configuration indication to the second node instead of sending the BH SSB measurement configuration indication by using the first node. In this case, the BH SSB measurement configuration indication in step S505 is not sent by the first node. It should be understood that, herein, for ease of description only, the BH SSB measurement configuration indication is described in FIG. 5 as being sent from the first node. Because the first node may also be the donor base station, the donor base station is not provided in the figure. However, it should not be understood that when the first node is the IAB node, S505 is definitely performed by the first node.

Therefore, correspondingly, the second node may directly receive the BH SSB measurement configuration indication from the first node, or receive the BH SSB measurement configuration indication from the donor base station. This specifically depends on implementation or a protocol definition. This is not limited in this application.

The BH SSB measurement configuration indication includes at least one of the SSB identifier, an SSB switch indication, and SSB mode information. Specific parameters and descriptions are the same as those described above, and details are not described again.

It should be understood that the BH SSB measurement configuration indication may include but is not limited to the foregoing information, and may further include other information, for example, an identifier of the measured node, for example, an identifier of the first node and a receive beam used for the measurement. The identifier of the measured node may be a PCI of the first node.

A method for determining the receive beam used for the measurement includes: (1) enabling the second node to perform the measurement by using a specified beam; (2) enabling the second node to independently select a proper beam for the measurement; and (3) enabling the second node to perform receive beam sweeping. (2) and (3) may be implemented through an explicit configuration, or may be implemented in an implicit manner. For example, when the second node receives the BH SSB measurement configuration indication, and a default receive beam configuration is used, the second node uses (2) to perform the measurement. When the second node receives an SSB reactivation indication, and a default receive beam configuration is used, the second node uses (3) to perform the measurement.

For the foregoing method (1), the BH SSB measurement configuration indication received by the second node includes explicit beam indication information. For example, a parent node of the second node indicates the second node to perform the measurement by using a beam of a reference signal received by the second node. For the IAB node, there may be another indication manner for the receive beam. To be specific, a beam indication of an SSB or another reference signal sent by the second node is used to indicate that the receive beam is the same as or close to a transmit beam of the SSB or the reference signal sent by the second node, or indicates that a spatial domain filter used by the IAB node for the measurement is the same as a spatial domain filter used by the IAB node for sending the SSB or the reference signal.

The receive beam of the second node is indicated by using (1) for at least the following two purposes: first, enabling the parent node or the donor node to learn of a signal that can be received by the second node by using a same beam; and second, learning of interference of the first node to a receiving direction of the second node, for example, interference to a backhaul link of the second node.

S506: The first node sends the SSB on the SSB sending subset.

After the first node (including the donor base station) completes the BH SSB measurement configuration indication, the first node sends the SSB to the second node, and the sent SSB is sent based on the BH SSB measurement configuration indication. A specific sending manner and an SSB mode are described above, and details are not described again.

It should be understood that, before sending the SSB in the SSB sending subset, the first node may further receive a BH SSB measurement configuration indication response sent by the second node. If the first node sends the BH SSB measurement configuration indication to the donor base station, the first node receives a BH SSB measurement configuration indication response sent by the donor base station, and the second node also sends the BH SSB measurement configuration indication response to the donor base station. Although not shown in FIG. 5, it should be understood that the first node may receive the BH SSB measurement configuration indication response. This may specifically depend on a definition in a protocol. This is not limited in this application.

S507: The second node measures the SSB on the SSB sending subset.

The second node measures the SSB at the configured SSB candidate location based on the BH SSB measurement configuration indication.

It should be understood that, the SSB measured by the second node on the SSB sending subset may include SSBs sent by a plurality of first nodes. The SSB measured by the second node on the SSB sending subset is actually a union set of the SSBs sent by the plurality of first nodes on the SSB sending subset. In other words, the second node may measure the SSBs sent by the plurality of first nodes at different or same SSB candidate locations. In this case, after receiving the BH SSB measurement configuration indication, the second node should measure the SSB at a plurality of SSB candidate locations, and the plurality of SSB candidate locations include a union set of candidate locations at which the plurality of first nodes send the SSBs.

It should be understood that, in the foregoing steps S501 to S507, steps performed by the first node depend on whether the first node is used as the IAB node or the donor base station, and whether the donor base station or the IAB node determines the SSB sending subset. For example, the first node is used as the IAB node, and the donor base station determines the SSB sending subset. In this case, the foregoing step S503 is performed by the donor base station, and the second node reports an SSB discovery or measurement result to the donor base station. The BH SSB measurement configuration indication in step S505 is also sent by the donor base station to the second node. In this case, when the first node is used as the IAB node, S501 needs to be performed to receive the SSB optimization configuration information from the donor base station, and send the SSB on the SSB sending subset. The first node may further send the BH SSB measurement configuration indication response to the donor base station. Therefore, there is no strong dependency between the foregoing steps, especially on a sending or receiving entity of a message. Specifically, when the first node is used as the donor base station or the AB node, how to process the message in FIG. 5 is described above. Details are not described again.

In the foregoing embodiment, an optimization configuration of the BH SSB is performed, so that overheads for sending the BH SSB by the first node can be reduced, and performance of the AC SSB can be considered. For the receive node, overheads for measuring the BH SSB may be reduced. Because overheads for sending or receiving the SSB are reduced, resource utilization of an NR IAB system is improved. In addition, transmit power of the first node or receive power of the second node may be reduced, thereby reducing energy consumption.

As described above, optimized BH SSB transmission is feasible for fixed IAB nodes. However, reactivation of the BH SSB should also be supported to transmit the SSB at the first candidate location of the SSB. This is mainly because a new node may be added to the IAB system, and the newly added TAB node may be located in a different direction or location. The optimized BH SSB is not transmitted in a direction of the newly added AB node. Therefore, the newly added JAB node and the already added JAB node cannot discover or measure each other. Therefore, it is necessary to trigger at least some of the JAB nodes to transmit the SSB at the first candidate location of the SSB. For ease of description, this process is referred to as SSB reactivation in this application.

The SSB reactivation includes at least two modes: periodic SSB reactivation and event-triggered SSB reactivation.

The periodic SSB reactivation is to periodically send or measure the SSB at the first candidate location of the SSB based on the optimized BH SSB transmission.

Figure 11:
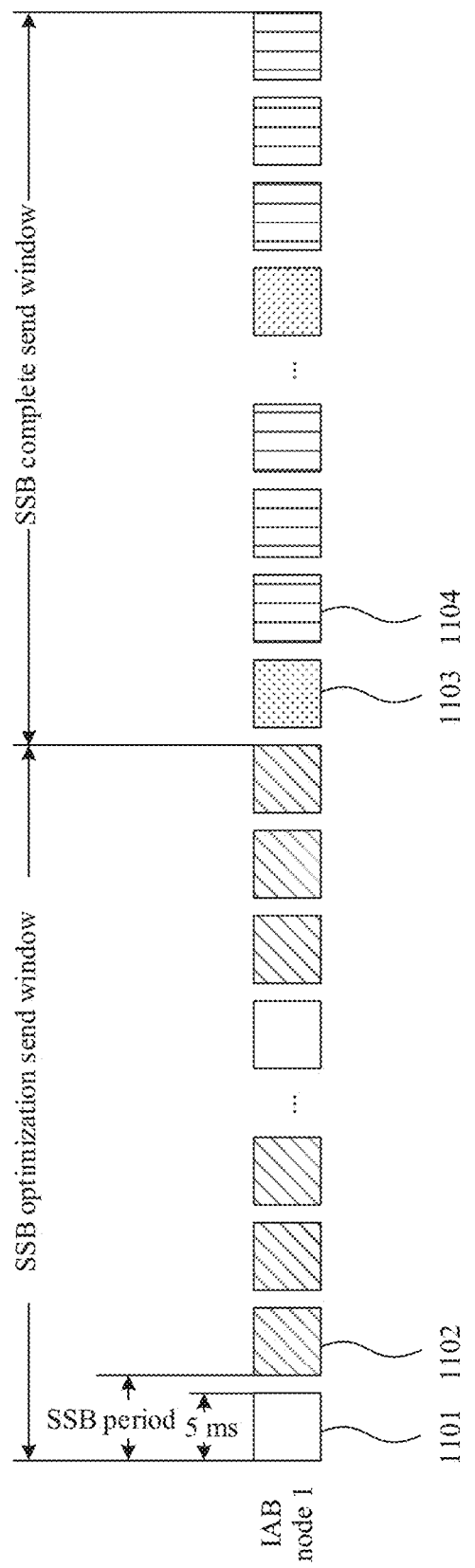
FIG. 11 is a schematic diagram of periodically sending an SSB at a first candidate location of the SSB according to an embodiment of this application.

FIG. 11 is an example of periodically sending the SSB at the first candidate location of the SSB. It should be understood that the measurement is similar. In this embodiment, sending by the IAB node 1 is used as an example for description.

In FIG. 11, 1101 is an optimized SSB receive half-frame, 1102 is an optimized SSB transmit half-frame, 1103 is a half-frame for receiving the SSB at the first candidate location of the SSB, and 1104 is a half-frame for sending the SSB at the first candidate location of the SSB. In addition, it is assumed that an interval between two SSB half-frames is an SSB period. A time length of the optimized SSB transmission is referred to as an SSB optimization send window, and may be m SSB measurement periods, where m is a positive integer. A time length for receiving the SSB or sending the SSB at the first candidate location of the SSB is referred to as an SSB complete send window, and may be n SSB measurement periods, where n is a positive integer. It should be understood that the names herein are merely for ease of description, and do not constitute any limitation.

As shown in FIG. 11, in the SSB optimization send window, the IAB node 1 performs receiving or sending in the SSB half-frame in the foregoing optimized manner, that is, receiving or sending of the SSB is performed only at some SSB candidate locations. In the SSB complete send window, the IAB node 1 sends or receives the SSB at the first candidate location of the SSB. Whether receiving or sending is performed in the SSB optimization send window or the SSB complete send window depends on the configuration. This is not limited in this application.

The donor base station or the first node may separately configure the SSB optimization send window and the SSB complete send window. However, it should be understood that, in the IAB system, all IAB nodes should keep complete or partially overlapping of SSB complete send windows. That is, it can be ensured that all IAB nodes each can receive, in the SSB complete send window, an SSB sent by a neighboring IAB node. A specific configured window size depends on implementation, and is not limited in this application.

Therefore, in the periodic SSB reactivation solution, at least an SSB optimization send window size and/or an SSB complete send window size need/needs to be configured. An initial start location of the SSB optimization send window and/or an initial start location of the SSB complete send window may further be included, for example, a frame number.

The event-triggered SSB reactivation may be independently triggered by the first node, or may be triggered by receiving a message sent by another node. Specifically, the following several events may be included:

Event 1: The first node receives a request from the donor base station. The request is used to request the first node to send the SSB at all the SSB candidate locations.

Event 2: The first node receives RSRP or an SINR of the SSB measured by the second node, and the RSRP or the SINR is lower than a specific threshold. Alternatively, a beam failure or a link failure occurs on the first node.

Event 3: The first node detects that RSRP or an SINR of the SRS of the second node is lower than a specific threshold, or channel status information (CSI) of the second node is lower than a specific preset threshold, or a transmission rate of the second node is lower than a specific threshold.

Event 4: The first node detects that a new AB node joins the AB system.

For the event 1, the donor base station may detect that a new JAB node joins the TAB system, and the donor base station may indicate a neighboring JAB node of the newly joined AB node to reactivate to send the SSB at the first candidate location of the SSB. The event 1 should further include signal quality that is between the second node and the first node and that is detected by the donor base station. For example, when RSRP or an SINR of the SSB is lower than a specific threshold, the donor base station indicates the first node to reactivate to send the SSB at the first candidate location of the SSB.

For the event 2, for an TAB node that supports a layer 3, the first node may trigger reactivation of sending the SSB at the first candidate location of the SSB. For an IAB node that supports a layer 2, because a function unit facing a child node does not have an RRC (radio resource control) function and/or a PDCP (packet data converge protocol) function, the first node is hard to support in triggering reactivation of sending the SSB at the first candidate location of the SSB. A layer 3 JAB node means that a function unit that is of the IAB node and that faces a child node supports an RRC (radio resource control) function and/or a PDCP (packet data converge protocol) function. A layer 2 IAB node does not support an RRC (radio resource control) function and/or a PDCP (packet data converge protocol) function.

For the event 4, for the JAB node that supports the layer 3, it is possible that joining of the new IAB node can be detected. For the IAB node that supports the layer 2, if an identification function of the IAB node can be supported at an adaptation layer, it is possible that joining of the new IAB node can be detected. This specifically depends on implementation, and is not limited in this application.

In conclusion, that the first node reactivates to send the SSB at the first candidate location of the SSB includes: The first node periodically activates to send the SSB at the first candidate location of the SSB. Alternatively, the first node sends the SSB at the first candidate location of the SSB based on a fact that the first node detects an event that meets a condition. Alternatively, the first node receives an SSB activation indication sent by the donor base station, where the SSB activation indication is used to indicate the first node to send the SSB at the first candidate location of the SSB.

It should be understood that the foregoing event is merely an example, and that the event-triggered SSB reactivation of transmitting the SSB at the first candidate location of the SSB includes but is not limited to the foregoing event.

In all the foregoing embodiments, transmission of a plurality of messages is involved. If the first node is the IAB node, a message or signaling between the first node and/or the second node and the donor base station may be transmitted by using RRC, F1-AP (F1-AP), F1-AP*, or MAC layer control element (CE). The F1-AP* is an enhancement of the F1-AP protocol. A specific type of signaling to be used is not limited in this application.

Transmission of a message between the first node and the second node depends on whether the first node and the second node are layer 3 IAB nodes or layer 2 IAB nodes. If the first node and the second node are the layer 3 IAB nodes, RRC transmission may also be supported. If the first node and the second node are the layer 2 IAB nodes, the message may be transmitted through adaptation layer signaling, a message, or a MAC CE. A specific message transmission manner depends on a definition in the protocol, and is not limited in this application.

After the first node reactivates to send the SSB at the first candidate location of the SSB, a mode of sending the SSB and/or receiving the SSB by the first node may change. If the mode of sending the SSB and/or receiving the SSB by the first node changes, the optimization configuration of the SSB needs to be performed again. For a specific method, refer to the foregoing embodiment. Details are not described again.

It should be understood that the foregoing reactivation of sending the SSB at the first candidate location of the SSB may occur only between two TAB nodes, or may be reactivation of sending the SSB at the first candidate location of the SSB between a plurality of IAB nodes for a measurement or discovery purpose. However, all IAB nodes in the entire IAB system do not need to be reactivated to send the SSB at the first candidate location of the SSB.

The SSB at the first candidate location of the SSB is reactivated to be sent, and a problem that the IAB nodes cannot discover or measure each other due to a change of an environment in the IAB system can be solved. Because the SSB complete send window size is configurable, overheads brought by sending the SSB at the first candidate location of the SSB can be controlled, and the system can support mutual detection between nodes.

In the foregoing embodiment, sending of the BH BBS is mainly used as an example. However, as described above, the foregoing embodiment is not limited to supporting in reducing overheads for sending or measuring the SSB only on the BH BBS. Overheads for measuring the access SSB can also be reduced. Because the access SSB is further used for measurement of the UE, when the JAB node performs node discovery by using the AC SSB, only measurement overheads are considered.

In a possible implementation, the IAB node uses a candidate location of the AC SSB for mutual discovery between nodes. A basic idea is the same as that of the BH SSB.

Because the IAB node uses the AC SSB to perform node discovery or measurement, when the TAB node measures another IAB node, sending of the AC SSB needs to be disabled. Disabling the sending of the AC SSB or muting the AC SSB inevitably affects common UE. Therefore, if a measurement half-frame of the IAB node is periodically configured, some UEs may always fail to detect the AC SSB.

Figure 12:
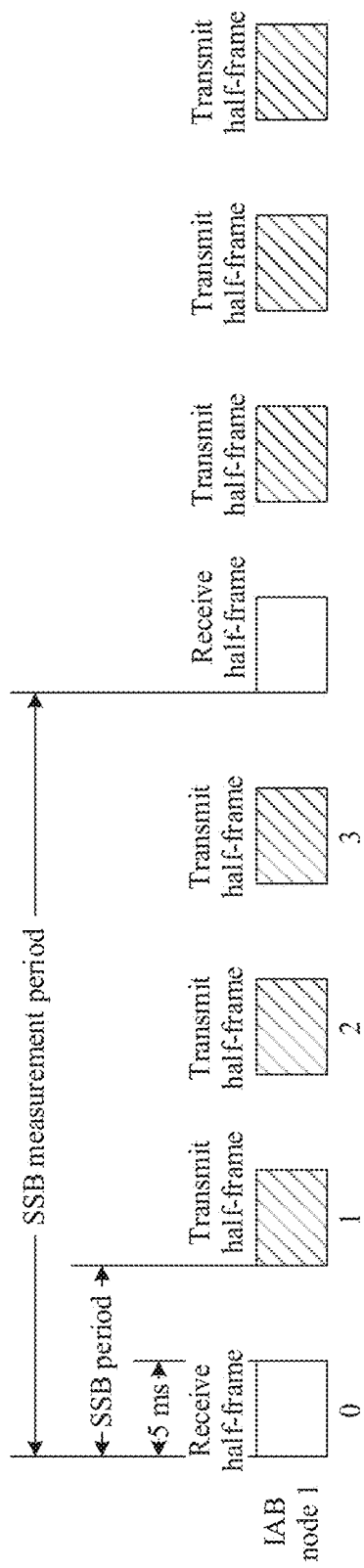
FIG. 12 is a schematic diagram in which a first node periodically measures an access SSB according to an embodiment of this application.

FIG. 12 is an example in which the TAB node 1 periodically measures the access SSB. A receive half-frame, a transmit half-frame, an SSB period, and an SSB measurement period in the figure are described in the foregoing FIG. 9. Details are not described again. A difference lies in that FIG. 12 shows measurement of the access SSB.

Figure 13:
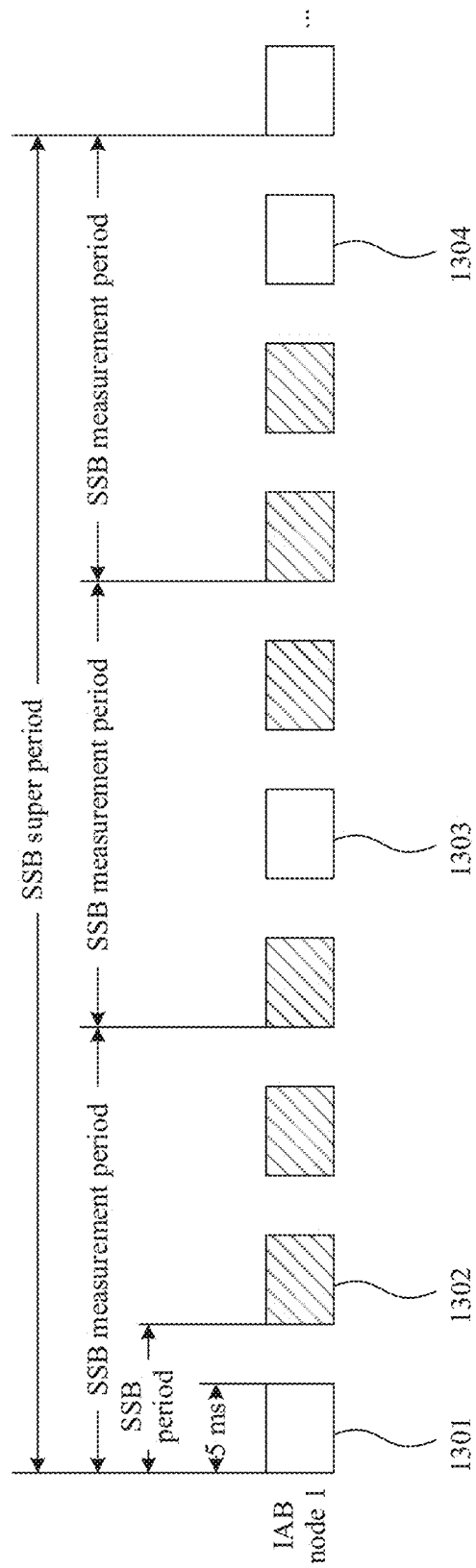
FIG. 13 is a schematic diagram in which a first node aperiodically measures an access SSB according to an embodiment of this application.

To reduce impact on the UE, muting by the IAB node on the AC SSB may be aperiodic. FIG. 13 is an example in which the AB node 1 aperiodically measures the access SSB.

In FIG. 13, a shaded box indicates that an SSB transmit half-frame, for example, 1302. Receive half-frames 1301, 1303, and 1304 are located at different SSB candidate locations in different SSB measurement periods. Three SSB half-frames (including one receive half-frame and three transmit half-frames) form one SSB measurement period. Three SSB measurement periods form one SSB super period. In a first SSB measurement period, the AB node performs receiving or measurement in a first SSB half-frame. In a second SSB measurement period, the IAB node performs receiving or measurement in a second SSB half-frame. In a third SSB measurement period, the IAB node performs receiving or measurement in a third SSB half-frame.

The foregoing solution may be extended to a case in which more AC SSB half-frames form one SSB super period. If a plurality of TAB nodes use the AC SSB to perform mutual measurement, a specific offset exists between receive half-frames of the IAB nodes, to ensure that the IAB nodes can perform mutual measurement. The method is similar to the configuration method of the BH SSB shown in FIG. 4, and a difference lies in that the AC SSB is used. Details are not described again.

Similar to a method for reducing overheads for measuring the BH SSB, when the AC SSB is used, a measurement node, for example, the second node, first measures the SSB at all AC SSB locations. After the measurement on the AC SSB is performed, a candidate location at which the SSB can be received may be determined. Different from the BH SSB, the AC SSB needs to keep being sent at the first candidate location of the SSB in the half-frame. Therefore, the candidate location of the AC SSB cannot further be optimized. For example, the measured SSB is arranged in consecutive SSB candidate locations to implement optimization. However, the second node may stop performing measurement at an SSB candidate location that does not need to be detected. In addition, the second node may determine, through configuration or by itself, an SSB that needs to be measured, for example, perform determining by using a measurement result such as the RSRP or the SINR. A specific measurement result to be used for determining is not limited in this application.

In addition, for the measurement node, for example, the second node, the AC SSB may continue to be sent at the SSB location at which the measurement stops to be performed, thereby reducing a UE performance loss caused by a stop of sending the SSB on the AC SSB. In this method, only UEs at some locations cannot measure the AC SSB, thereby reducing impact on the UE.

If one node performs measurement only at some SSB candidate locations in a receive half-frame, there is a possibility that both a transmit SSB and a receive SSB exist in the receive half-frame. Due to a convention time between sending/receiving of a power amplifier, a conflict caused by the sending/receiving and switching may occur.

As described above, for subcarrier spacings of 120 kHz and 240 kHz, locations at which SSBs are sent are as follows:

For the subcarrier spacing of 120 kHz, the SSB is sent according to {4, 8, 16, 20}+28×n. For a frequency band greater than 6 GHz, n=0, 1, 2, 3, 5, 6, 7, 8, 10, 11, 12, 13, 15, 16, 17, or 18.

For the subcarrier spacing of 240 kHz, the SSB is sent according to {8, 12, 16, 20, 32, 36, 40, 44}+56×n. For a frequency band greater than 6 GHz, n=0, 1, 2, 3, 5, 6, 7, or 8.

An example in which the SSB is sent at all the SSB candidate locations is used. It can be learned that when the SSB with the subcarrier spacing of 120 kHz is sent, there is no symbol spacing between SSBs sent in a symbol 4 and a symbol 8, there is no symbol spacing between SSBs sent in a symbol 16 and a symbol 20, and there are four symbols reserved between a symbol 8 and a symbol 16. Therefore, if the TAB node measures an SSB starting from the symbol 4 or 8, during receive/transmit conversion, because there is no symbol spacing between two SSBs, one or more symbols need to be used to perform antenna receive/transmit conversion. It should be understood that the receive/transmit conversion includes a conversion from receiving to transmitting, and also includes a conversion from transmitting to receiving. Because the current half-frame is originally used for measuring the SSB, measurement performance needs to be preferably ensured. Therefore, when the receive/transmit conversion of the SSB is performed, it should be first ensured that a symbol at a candidate location at which the SSB is received cannot be used for the receive/transmit conversion.

To meet the foregoing constraint, an optional method is discarding symbols before or after the candidate location at which the SSB is received. If a symbol used for the receive/transmit conversion just falls at a candidate location at which the SSB is sent, a corresponding SSB cannot be used to send the SSB. Because some symbols cannot be sent, the sent SSB is incomplete. It should be understood that the symbol that cannot be used to send the SSB at the SSB candidate location is not limited to being used for other data transmission.

Similarly, for the subcarrier spacing of 240 kHz, SSBs starting from symbols 8, 12, 16, and 20 are sent on consecutive symbols, and SSBs starting from symbols 32, 36, 40, and 44 are also consecutive on symbols. The same problem exists and is not described herein again.

In conclusion, in the foregoing case, it may be specified in the protocol that when one SSB is used for measurement, if a candidate location of another SSB and the SSB used for the measurement are consecutive in symbols, the another AC SSB is not sent.

In the foregoing description, it is assumed that the TAB node needs to send and measure a complete SSB, where the complete SSB includes four OFDM symbols including a PSS, an SSS, and a PBCH. In a possible implementation, when the transmit SSB is before the receive SSB, because of a switching time, the TAB node cannot send a last symbol of a first SSB or cannot receive a first symbol of a second SSB. A first symbol of the SSB is a PSS, and the first symbol of the SSB may not be necessary in a measurement process. Therefore, the JAB node may perform both complete sending of the first SSB and partial receiving of the second SSB. Similarly, in another possible implementation, when the transmit SSB is after the receive SSB, because of a switching time, the AB node cannot receive a last symbol of a first SSB or cannot send a first symbol of a second SSB. A last symbol of the SSB is a PBCH symbol. If the second node measures only the RSRP, the symbol may not be required. Therefore, the JAB node may perform both partial receiving of the first SSB and complete sending of the second SSB. It should be noted that the foregoing partial receiving is merely a special example, and whether partial measurement can be performed depends on factors such as a protocol specification, implementation of the second node, and configuration of the parent node.

Similarly, the AC SSB may also be reactivated to be measured. A specific method is similar to that in the foregoing embodiment, and details are not described again.

It should be noted that, a main difference between the AC SSB and the BH SSB in this embodiment lies in that: For the AC SSB, in a half-frame, the IAB node may send an SSB at an SSB candidate location at which no SSB measurement is performed, and for the BH SSB, the AB node does not send an SSB in an SSB half-frame in which measurement is performed. In a possible implementation, for the BH SSB, in the half-frame, the JAB node may also send the SSB at an SSB candidate location at which no SSB measurement is performed. In this case, the solution in this embodiment may also be used for the BH SSB.

The foregoing mainly describes the solutions provided in the embodiments of this application from a perspective of interaction between network elements. It can be understood that, to implement the foregoing functions, the network elements, for example, the first node and the second node, include corresponding hardware structures and/or software modules for performing the functions. A person skilled in the art should be easily aware that, in combination with the examples described in the embodiments disclosed in this specification, network elements and algorithm steps may be implemented by using hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, each of the first node and the second node may be divided into functional modules based on the foregoing method examples. For example, each of the first node and the second node may be divided into functional modules, or two or more functions may be integrated into one processing module. The integrated module may be implemented in a form of hardware, or may be implemented in a form of a software functional module. It should be noted that, in the embodiments of this application, division into the modules is an example, and is merely logical function division. During actual implementation, another division manner may be used. It should also be understood that the first node may be an IAB node, or may be a donor base station.

Figure 14:
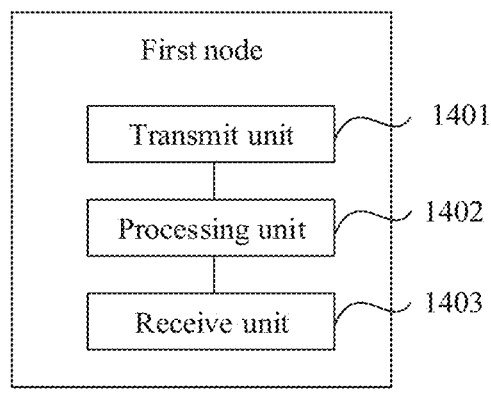
FIG. 14 is a possible schematic structural diagram of a first node according to an embodiment of this application.

FIG. 14 is a schematic diagram of a possible structure of the relay device in the foregoing embodiments according to this application. In this application, the first node may be an IAB node, or may be a donor base station. The first node includes a transmit unit 1401, a processing unit 1402, and a receive unit 1403. The transmit unit 1401 is configured to support the first node in performing S501, S505, or S506 in FIG. 5, and is configured to support the first node in the foregoing embodiment in sending the BH SSB measurement configuration indication response to the donor base station. The processing unit 1402 is configured to support the first node in performing S504 in FIG. 5, and is configured to support the first node in the foregoing embodiment in reactivating to send the SSB at the first candidate location of the SSB, or is configured to support the first node in the foregoing embodiment in using the access SSB for the backhaul link measurement, determining the AC SSB used for the backhaul link measurement, determining that the candidate location of the another AC SSB and the AC SSB used for the backhaul link measurement are consecutive in the symbols, and skipping sending the another AC SSB. The receive unit 1403 is configured to support the first node in performing S503 in FIG. 5, and is configured to support the first node in the foregoing embodiment in receiving the SSB activation indication sent by the donor base station.

In hardware implementation, the transmit unit 1401 may be a transmitter, the receive unit 1403 may be a receiver, and the receiver and the transmitter are integrated into a communications unit to form a communications interface.

Figure 15:
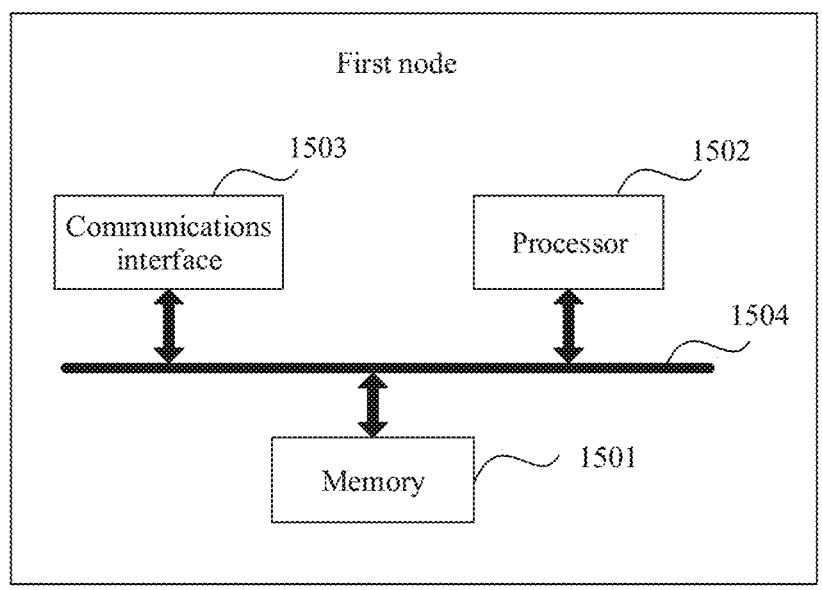
FIG. 15 is a schematic diagram of a possible logical structure of a first node according to an embodiment of this application.

FIG. 15 is a schematic diagram of a possible logical structure of the first node in the foregoing embodiments according to an embodiment of this application. The first node includes a processor 1502. In this embodiment of this application, the processor 1502 is configured to control and manage an action of the first node. For example, the processor 1202 is configured to support the first node in performing S504 in FIG. 5 in the foregoing embodiment, and is configured to support the first node in the foregoing embodiment in reactivating to send the SSB at the first candidate location of the SSB, or is configured to support the first node in the foregoing embodiment in using the access SSB for the backhaul link measurement, determining the AC SSB for the backhaul link measurement, determining that the candidate location of the another AC SSB and the AC SSB used for the backhaul link measurement are consecutive in the symbols, and skipping sending the another AC SSB. Optionally, the first node may further include a memory 1501 and a communications interface 1503. The processor 1502, the communications interface 1503, and the memory 1501 may be connected to each other or connected to each other through a bus 1504. The communications interface 1503 is configured to support the first node in performing communication, and the memory 1501 is configured to store program code and data of the first node. The processor 1502 invokes the code stored in the memory 1501 to perform control management. The memory 1501 may be coupled to or not coupled to the processor.

The processor 1502 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1504 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

Figure 16:
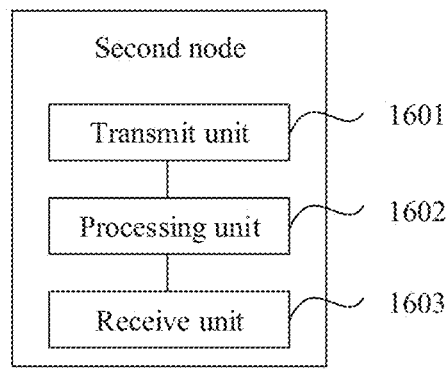
FIG. 16 is a possible schematic structural diagram of a second node according to an embodiment of this application.

FIG. 16 is a schematic diagram of a possible structure of the second node in the foregoing embodiments according to this application. In this application, the second node is a relay node. The second node includes a transmit unit 1601, a processing unit 1602, and a receive unit 1603. The transmit unit 1601 is configured to support the second node in performing S503 in FIG. 5, and is configured to support the second node in sending the BH SSB measurement configuration indication response in the foregoing embodiment. The processing unit 1602 is configured to support the second node in performing S502 or S507 in FIG. 5, and the processing unit 1602 is further configured to support the second node in reactivating to measure the SSB at all the SSB candidate locations in the foregoing embodiment. The receive unit 1603 is configured to support the second node in performing S501, S506, or S507 in FIG. 5.

In hardware implementation, the transmit unit 1601 may be a transmitter, the receive unit 1603 may be a receiver, and the receiver and the transmitter are integrated into a communications unit to form a communications interface.

Figure 17:
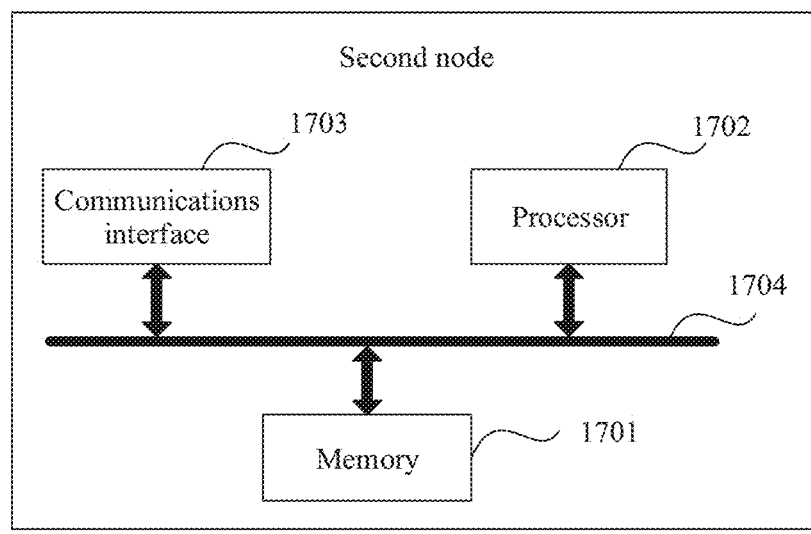
FIG. 17 is a schematic diagram of a possible logical structure of a second node according to an embodiment of this application.

FIG. 17 is a schematic diagram of a possible logical structure of the second node in the foregoing embodiments according to an embodiment of this application. The second node includes a processor 1702. In this embodiment of this application, the processor 1702 is configured to control and manage an action of the second node. For example, the processor 1702 is configured to support the second node in performing S502 or S507 in FIG. 5 in the foregoing embodiment, and support the second node in reactivating to measure the SSB at all the SSB candidate locations in the foregoing embodiment. Optionally, the second node may further include a memory 1701 and a communications interface 1703. The processor 1702, the communications interface 1703, and the memory 1701 may be connected to each other or connected to each other through a bus 1704. The communications interface 1703 is configured to support the second node in performing communication, and the memory 1701 is configured to store program code and data of the second node. The processor 1702 invokes the code stored in the memory 1701 to perform control management. The memory 1701 may be coupled to or not coupled to the processor.

The processor 1702 may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1704 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 17, but this does not mean that there is only one bus or only one type of bus.

In another embodiment of this application, a computer-readable storage medium is further provided. The computer-readable storage medium stores a computer-executable instruction. When performing the steps of the first node and the second node of reactivating to measure the SSB at all the SSB candidate locations or activating to send the measurement signal configuration method of the SSB at all the SSB candidate location in FIG. 5, a device (which may be a single-chip microcomputer, a chip, or the like) or a processor reads the computer-executable instruction in the storage medium. The foregoing computer-readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer-executable instruction, and the computer-executable instruction is stored in a computer-readable storage medium. At least one processor of a device may read the computer-executable instruction from the computer-readable storage medium, and the at least one processor executes the computer-executable instruction, so that the device implements the steps performed by the first node and the second node in the measurement signal configuration method provided in FIG. 5 to FIG. 13.

In another embodiment of this application, a communications system is further provided. The communications system includes at least a first node and a second node. The first node may be the first node provided in FIG. 14 or FIG. 15, and is configured to perform the steps of the first node in the measurement signal configuration methods provided in FIG. 5 to FIG. 13. The second node may be the second node provided in FIG. 16 or FIG. 17, and is configured to perform the steps performed by the second node in the measurement signal configuration methods provided in FIG. 5 to FIG. 13. It should be understood that the communications system may include a plurality of first nodes and a plurality of second nodes. The first node may measure SSBs sent by the plurality of second nodes, and may further send, to the plurality of second nodes, SSBs used for node discovery and measurement of a backhaul link.

In this embodiment of this application, an SSB is sent at a first candidate location of the SSB, or an SSB sent at a first candidate location of the SSB is measured, so that an SSB that needs to be sent by the first node can be determined. This reduces overheads caused when the first node sends the SSB at the first candidate location of a backhaul SSB, saves transmit power, and improves resource utilization. For the second node, measurement may be performed only at a candidate location of an SSB that needs to be measured. This reduces measurement overheads and saves power, and improves resource utilization of the second node. Optimization configuration is performed on a measurement signal. This greatly improves resource utilization and transmission performance of the system. This resolves a problem of overheads for sending or receiving the SSB at the first candidate location of the SSB.

In conclusion, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

The invention claimed is:

1. A method comprising:
   sending, by a first node of a wireless system, a synchronization signal block (SSB) at a set of candidate locations of SSBs, wherein the SSB is used by a second node of the wireless system to detect or measure the SSB;
   receiving, by the first node, SSB optimization configuration information comprising an identifier of the SSB;
   determining, by the first node, a subset of the set of candidate locations based on the SSB optimization configuration information; and
   sending, by the first node, the SSB at the subset of the set of candidate locations.

2. The method according to claim 1, wherein the first node receives the SSB optimization configuration information from the second node or a donor base station, and the SSB optimization configuration information comprises at least one of an identifier of the second node, a reference signal received power (RSRP), or a signal-to-interference ratio (SINR) for measuring the SSB, an identifier of the first node, or a backhaul SSB configuration indication.

3. The method according to claim 2, wherein the backhaul SSB configuration indication comprises at least one of the identifier of the SSB, an SSB switch indication, or SSB mode information.

4. The method according to claim 1, comprising:
   after sending the SSB at the subset of the set of candidate locations, sending, by the first node, the SSB at the set of candidate locations of SSB in response to receiving from a donor base station, an SSB activation indication indicating the first node to send the SSB at the set of candidate locations of SSB.

5. The method according to claim 1, wherein resending the SSB at the set of candidate locations is performed periodically or indicated by a donor base station.

6. The method according to claim 1, wherein the SSB comprises an SSB used for backhaul link measurement and an SSB used for initial access of a terminal device.

7. The method according to claim 6, comprising:
   determining, by the first node, a first access SSB for the backhaul link measurement and a second access SSB;
   measuring, by the first node, a backhaul link based on the first access SSB; and
   determining, by the first node, to send the first access SSB in response to determine that the first access SSB and the second access SSB have consecutive candidate symbol locations.

8. A first device of a wireless system, comprising:
   at least one processor;
   one or more memories coupled to the at least one processor and storing programming instructions for execution by the at least one processor to perform operations comprising:

sending a synchronization signal block (SSB) at a set of candidate locations of SSBs, wherein the SSB is used by a second device of the wireless system to detect or measure the SSB;

receiving SSB optimization configuration information comprising an identifier of the SSB;

determining a subset of the set of candidate locations based on the SSB optimization configuration information; and sending, the SSB at the subset of the set of candidate locations.

9. The first device according to claim 8, wherein the operations further comprising:

receiving the SSB optimization configuration information from the second device or a donor base station, and the SSB optimization configuration information comprises at least one of an identifier of the second device, a reference signal received power (RSRP), or a signal-to-interference ratio (SNR) for measuring the SSB, an identifier of the first device, or a backhaul SSB configuration indication.

10. The first device according to claim 9, wherein the backhaul SSB configuration indication comprises at least one of the identifier of the SSB, an SSB switch indication, or SSB mode information.

11. The first device according to claim 8, wherein the operations further comprising:

after sending the SSB at the subset of the set of candidate locations, sending the SSB at the set of candidate locations of SSB in response to receiving from a donor base station, an SSB activation indication indicating the first device to send the SSB at the set of candidate locations of SSB.

12. The first device according to claim 11, wherein resending the SSB at the set of candidate locations is performed periodically or indicated by a donor base station.

13. The first device according to claim 8, wherein the SSB comprises an SSB used for backhaul link measurement and an SSB used for initial access of a terminal device.

14. The first device according to claim 13, wherein the operations further comprising:

determine a first access SSB used for the backhaul link measurement and a second access SSB;

measuring a backhaul link based on the first access SSB; and determining to skip sending the second access SSB in response to determine that the first access SSB and the second access SSB have consecutive candidate symbol locations.

15. A second device of a wireless system comprising:
at least one processor;
one or more memories coupled to the at least one processor and storing programming instructions for execution by the at least one processor to perform operations comprising:

measuring a synchronization signal block (SSB) at a set of SSB candidate locations of a first device of the wireless system;

sending SSB optimization configuration information to a donor base station or the first device, wherein the SSB optimization configuration information comprises an identifier of the SSB; receiving a backhaul SSB measurement configuration indication indicating a subset of the set of SSB candidate locations of the first device; and measuring a backhaul SSB according to the backhaul SSB measurement configuration indication.

16. The second device according to claim 15, wherein the backhaul SSB measurement configuration indication comprises at least one of an identifier of the second device, a reference signal received power (RSRP), or a signal-to-interference ratio (SINR) for measuring the SSB, an identifier of the first device, or backhaul SSB configuration information.

17. The device according to claim 15, wherein the operations further comprising:

receiving the backhaul SSB measurement configuration indication sent by the donor base station or the first device.

18. The second device according to claim 15, wherein the backhaul SSB measurement configuration indication comprises at least one of the identifier of the SSB, an SSB switch indication, or SSB mode information.

19. The second device according to claim 15, wherein the operations further comprising:

after measuring the backhaul SSB, measuring the SSB at the SSB candidate locations in response receiving from the donor base station, a backhaul SSB measurement configuration indication.

20. The second device according to claim 19, wherein resending the SSB at the set of candidate locations is performed periodically or indicated by a donor base station.

* * * * *